(12) United States Patent
Aoki

(10) Patent No.: US 6,445,481 B2
(45) Date of Patent: Sep. 3, 2002

(54) ON-FULCRUM MOVEMENT DRIVE APPARATUS

(75) Inventor: Kazuhiko Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/725,229

(22) Filed: Nov. 29, 2000

Related U.S. Application Data

(62) Division of application No. 09/274,472, filed on Mar. 23, 1999, now Pat. No. 6,188,502.

(30) Foreign Application Priority Data

Mar. 26, 1998 (JP) .............................. 10-079855
Nov. 12, 1998 (JP) .......................... 10-321868

(51) Int. Cl.⁷ ............................................. G02B 26/08
(52) U.S. Cl. ..................................... 359/198; 359/224
(58) Field of Search ................................ 359/198–226, 359/811–814, 871–874, 876–877; 248/479, 487

(56) References Cited

U.S. PATENT DOCUMENTS 3,532,408 A   10/1970   Dostal
4,157,861 A * 6/1979   Davies .................... 359/225
5,550,669 A   8/1996   Patel

FOREIGN PATENT DOCUMENTS

| JP | 63-34499 | 2/1988 |
|----|----------|--------|
| JP | 3-264911 | 11/1991 |
| JP | 6-59181  | 3/1994 |
| JP | 6-333081 | 12/1994 |
| JP | 7-146447 | 6/1995 |
| JP | 7-185866 | 7/1995 |
| JP | 8-220455 | 8/1996 |
| JP | 9-320083 | 12/1997 |

* cited by examiner

Primary Examiner—James Phan
(74) Attorney, Agent, or Firm—Sughrue Mion, PLLC

(57) ABSTRACT

An on-fulcrum movement drive apparatus for moving a driven object such as a mirror or an antenna. The apparatus includes a frame for supporting the driven object; an elastic support mechanism between the frame and the driven object for supporting the driven object generally at a center of its rear surface; and an actuator provided on the frame for accurately moving the driven object with reduced power by applying a force to a position on the driven object that is apart from the position where the elastic support mechanism supports the driven object.

27 Claims, 17 Drawing Sheets

ON-FULCRUM MOVEMENT DRIVE APPARATUS

This is a divisional of application Ser. No. 09/274,472 filed Mar. 23, 1999, now U.S. Pat. No. 6,188,502, the disclosure of which is incorporated herein by reference.

BACKGROUND OF THE INVENTION

1. Field of the Invention

The present invention relates to a laser pointing apparatus and in particular, to a laser pointing apparatus having a small size and small weight and capable of controlling a high-accuracy positioning. Moreover, the present invention relates to an on-fulcrum movement drive apparatus for use in the laser pointing apparatus and an antenna and a mirror which are located in an outer space.

2. Description of the Related Art

[A] Firstly, explanation will be given on a conventional laser pointing apparatus.

A laser beam machining apparatus and a laser display apparatus, a laser scan apparatus, and the like, in general, employ a laser pointing apparatus for controlling a laser beam emission angle or a laser beam incident angle.

In most of the conventional laser pointing apparatuses, two mirrors are used in combination for scanning a two-dimensional plane with a laser beam. However, there is a strong desire for reduction in the apparatus size and production cost as well as for simplification of a procedure for optical axis matching and positioning.

In order to satisfy these requirements, for example, Japanese Patent Publication (Unexamined) A-7-185866 discloses an apparatus including a single mirror, a rotary support member which can rotate around a normal axis of the mirror, and a mirror positioning mechanism supported by the support member. In this apparatus, a two-dimensional plane can be scanned by a laser beam using the single mirror.

Hereinafter, explanation will be given on some examples of conventional laser pointing apparatus with reference to the attached drawings.

FIG. 21 is a side cross sectional view of a conventional laser pointing apparatus including: a mirror 101; an electromagnetic exciter 105 for moving the mirror 101; a rotary support member 106 for supporting the mirror 101 and the electromagnetic exciter 105; and a motor rotating the rotary support body 106.

The mirror 101 can be deflected around the Z axis by rotation of the rotary support member 106 driven by the motor 109 and also deflected around the oscillation center 103. This enables a laser beam to scan any position on a two-dimensional plane with the single mirror.

[B] Next, explanation will be given on a conventional on-fulcrum movement drive apparatus.

An antenna mounted on an artificial satellite or other space object is positioned by an on-fulcrum movement drive apparatus so as to assure a preferable communication with an earth station. The on-fulcrum movement drive apparatus moves the antenna around the X axis and Y axis which vertically intersects the X axis. Conventionally, this positioning around two axes has been effectuated by using a support mechanism having two bearings arranged vertical to each other. Moreover, this type of on-fulcrum movement drive apparatus is employed not only for an antenna but also for positioning a mirror and driving a positioning table.

In general, for the apparatuses to be mounted on an artificial satellite, there is a strong requirement for reduction in size and weight. The on-fulcrum movement drive apparatus has also been improved in various ways to satisfy the aforementioned requirement. For example, Japanese Patent Publication (Unexamined) A-53-34499 discloses an on-fulcrum movement drive apparatus in which an object to be driven is supported at a single point of a spherical bearing.

FIG. 22 is a cross sectional view of such a conventional on-fulcrum movement drive apparatus. The on-fulcrum movement drive apparatus shown in FIG. 22 includes: an antenna 301 as an object to be positioned; a spherical bearing 302 for movably supporting the antenna 301; a piston 303 for driving the antenna 301; a linear motor 304 for driving the piston 303; a sensor 305 for detecting displacement of the linear motor 304; and a spring 306 for pushing the antenna 301 toward the piston 303.

According to a detection result of displacement detected by the sensor 305, the linear motor 304 drives the piston 303 and the antenna 301 is moved around the spherical bearing 302 as a fulcrum.

Although not depicted, another set of a piston, a linear motor, and a sensor is arranged in a direction vertically intersecting the drive direction of the piston 303. Thus it is possible to obtain a movement around two axes.

However, the conventional laser pointing apparatus and the conventional on-fulcrum movement drive apparatus have following problems.

[A] Firstly, explanation will be given on the problems involved in the conventional laser pointing apparatus.

The first problem is that the conventional laser pointing apparatus is too large in size because it employs an electromagnetic exciter and a motor having a large volume.

The second problem is that the apparatus is too heavy because the rotary support member requires a comparatively high support strength and becomes heavy. Accordingly, the motor for driving the rotary support member also becomes heavy.

The third problem is that a large power consumption is required. This is because rotation of the mirror around the normal requires rotation of not only the mirror but also the large-mass positioning mechanism constituted by the electromagnetic exciter and the rotary support member.

The fourth problem is that it is difficult to control a pointing position with a high accuracy. This is because the rotation is driven by a motor and a belt. That is, non-linear elements such as the motor torque ripple and the belt expansion/shrinking are involved in the control system.

[B] Next, explanation will be given on the problems involved in the conventional on-fulcrum movement drive apparatus.

The first problem is that it is difficult to control positioning with a high accuracy. That is, the spherical bearing 302 cannot eliminate fluctuation and friction. During a drive, non-linear external components are involved in the control system, lowering the positioning accuracy.

The second problem is that the conventional on-fulcrum movement drive apparatus cannot be used in an outer space. In order to maintain a predetermined sliding characteristic on the spherical bearing 302, a certain amount of lubricant should be present. However, this is difficult in an outer space where a lubricant easily volatilizes.

SUMMARY OF THE INVENTION

It is therefore an object of the present invention to provide a laser pointing apparatus small in size and weight and capable of a highly accurate positioning with a reduced power consumption.

Another object of the present invention is to provide an on-fulcrum movement drive apparatus which can perform positioning with a highly accurate angle and which can also be used in an outer space.

The laser pointing apparatus according to the present invention is for pointing a laser beam on a predetermined position and comprises: a mirror extending on a X-Y plane and having a mirror surface for reflecting the laser beam; a mirror holder arranged so as to be displaceable and having a mirror holder main body for holding the mirror and at least three arms extending outwardly from the mirror holder main body; an elastic support mechanism for supporting the mirror holder main body according to the displacement of the mirror holder around a point on a Z axis passing through the center of the mirror and vertically intersecting the X-Y plane; a base for supporting the elastic support mechanism;
  coil type electromagnets (hereinafter, referred to as coil magnets) arranged on the respective arms so as to generate a line of magnetic force in the Z axis direction; and permanent magnets provided on the base facing the corresponding coil magnets so as to generate a line of magnetic force in the Z axis direction,
  wherein a magnetic force generated by interaction between the permanent magnets and the coil magnets supports the mirror holder in such a manner that the mirror holder can be translated in the Z axis direction and also rotated around the mirror center.

According to another aspect of the present invention, the laser pointing apparatus comprises: a mirror extending on a X-Y plane and having a mirror surface for reflecting the laser beam; a mirror holder arranged so as to be displaceable and having a mirror holder main body for holding the mirror and at least three arms extending outwardly from the mirror holder main body; an elastic support mechanism for supporting the mirror holder main body according to the displacement of the mirror holder around a point on a Z axis passing through the center of the mirror and vertically intersecting the X-Y plane; a base for supporting the elastic support mechanism;
  permanent magnets arranged on the respective arms so as to generate a line of magnetic force in the Z axis direction; and coil magnets provided on the base facing the corresponding coil magnets, so as to generate a line of magnetic force in the Z axis direction,
  wherein a magnetic force generated by interaction between the permanent magnets and the coil magnets supports the mirror holder in such a manner that the mirror holder can be translated in the Z axis direction and also rotated around the mirror center.

That is, according to the present invention, the drive source includes only coil magnets and permanent magnets. Thus, the apparatus is small in size and weight. Moreover, the object to be driven includes only the mirror, mirror holder, arms, and the coil magnets which have small weights, enabling to significantly reduce the power consumption required for the drive compared to a conventional apparatus. Furthermore, the coil magnets and permanents serving as the drive source do not cause any friction in the drive mechanism as in a conventional apparatus. That is, no non-linear element is involved in the drive source, which enables to perform positioning with a high accuracy.

In the aforementioned apparatuses, the translation in the Z-axis direction may not be used.

It is preferable that the elastic support mechanism support the mirror holder in such a manner that the mirror holder can rotate around the X and Y axes on the X-Y plane. In this case, it is preferable that the elastic support mechanism be constituted by a pivot provided on the Z axis for supporting a rear surface of the mirror holder and a plate spring having a tip end attached to the tip end of the pivot.

In the laser pointing apparatus having the aforementioned configuration, a current is applied to the coil magnets, so that a force is generated between the coil magnets and the permanent magnets, generating a moment of rotation around the X and Y axes vertically intersecting each other on the mirror surface. This moment moves the mirror simultaneously in two directions so that any position on the two-dimensional plane can be scanned by a laser beam.

Moreover, it is preferable that the laser pointing apparatus further comprise: distance displacement sensors for detecting a Z-axis direction displacement from a stationary position of a reference point on each of the arms; and a control block for receiving signals from the distance displacement sensors to calculate an angle (hereinafter, referred to as an angular displacement) of rotation of the mirror from the stationary position, and adjusting coil currents to be applied to the coil magnets according to the relationships between the permanent magnets and the coil magnets, thus controlling the angular displacement.

In this case the control block, for example, includes: angle calculation means for calculating an angular displacement from the position displacement values detected by the distance displacement sensors; an angle specifier for specifying a target angular displacement; angle control means for calculating coil current adjustment values for the respective coil magnets so that the angular displacement calculated is matched with the target angular displacement, and for generating coil current instruction signals instructing to apply coil currents of the calculated values to the respective coil magnets; and a coil magnet driver circuit for applying currents to the respective coil magnets according to the coil current instruction signals.

The reference point is a measurement point where a mirror angular displacement can be sufficiently detected from the Z-axis direction position displacement.

Furthermore, the elastic support mechanism can move the mirror holder in the Z-axis direction; and the control block may further include: translation amount calculation means for calculating an average value of the respective arm displacement in the Z-axis direction so as to obtain an average translation distance (hereinafter, referred to as an actual translation amount) of the mirror in the Z-axis direction; a translation amount specifier for specifying a target translation amount (hereinafter, referred to as a target translation amount); translation amount control means for calculating a second adjustment value of the coil current which causes the actual translation amount to be matched with the target translation amount, and for generating a coil current adjustment signal; and a translation amount regulator for adding the coil current instruction signal to the coil current adjustment signal to obtain a new coil current instruction signal to be transmitted to the coil magnet driver circuit.

This enables to control displacement of the mirror in the Z axis direction as well. Thus, the laser pointing apparatus can prevent unintentional movement of the laser beam pointing.

According to yet another aspect of the present invention, there is provided an on-fulcrum movement drive apparatus for moving an object to be driven around two imaginary axes vertically intersecting each other, the apparatus comprising: a frame for supporting the object to be driven; an elastic support mechanism provided between the frame and the object to be driven, for supporting the object to be driven at one point on the rear surface of the object, so that the object is movably mounted on the frame; and an actuator provided on the frame for moving the object to be driven, by applying a force to a position on the object which is apart from the support position supported by said elastic support mechanism.

In the on-fulcrum movement drive apparatus, the object to be driven is supported on one point of its rear surface by an elastic support mechanism made from an elastic material in such a manner that the object can be moved around the aforementioned one point. Thus application of force by actuators to the object can move the object around two axes vertically intersecting each other.

Moreover, because the object to be driven is fixed to the elastic support mechanism, there is no fluctuation or friction such as in the case of spherical bearing. No no-linear external component is involved in the control system during a drive period. This enables to control the angle of the object with a high accuracy.

Furthermore, in contrast to the spherical bearing which requires a lubricant, the apparatus of the present invention has no problem of lubricant evaporation and can be used in a vacuum such as in an open space.

DESCRIPTION OF THE PREFERRED EMBODIMENTS

Firstly, explanation will be given on a laser pointing apparatus according to preferred embodiments of the present invention with reference to the attached drawings.

It should be noted that each of the embodiments below employs four coil magnets, four permanent magnets, four arms, and four distance displacement sensors. However, it is also possible to use three of them or five of them.

<Embodiment A1>

Figure 1:
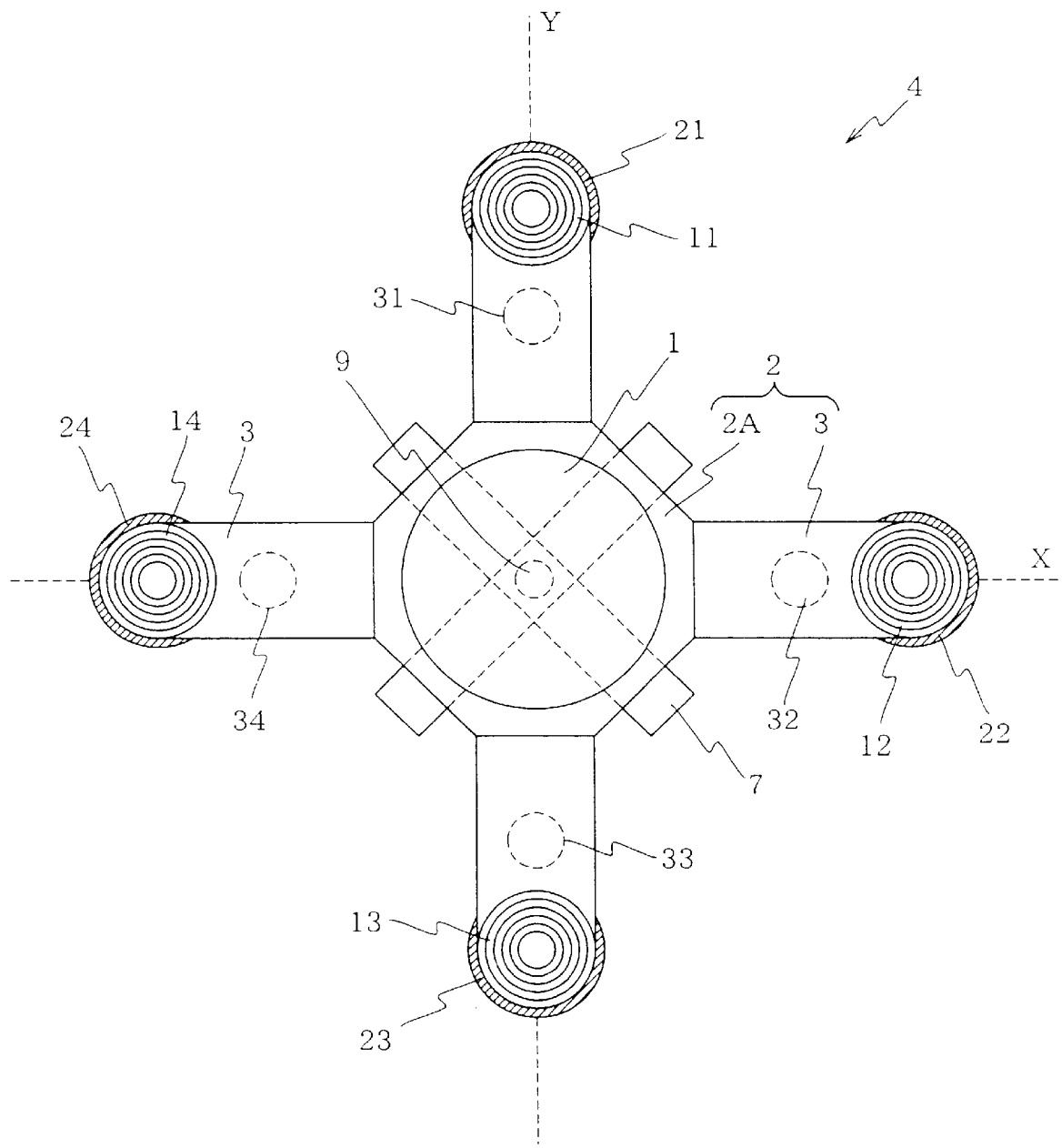
FIG. 1 is a plan view of a laser pointing apparatus according to a first embodiment (A1) of the present invention.
Figure 2:
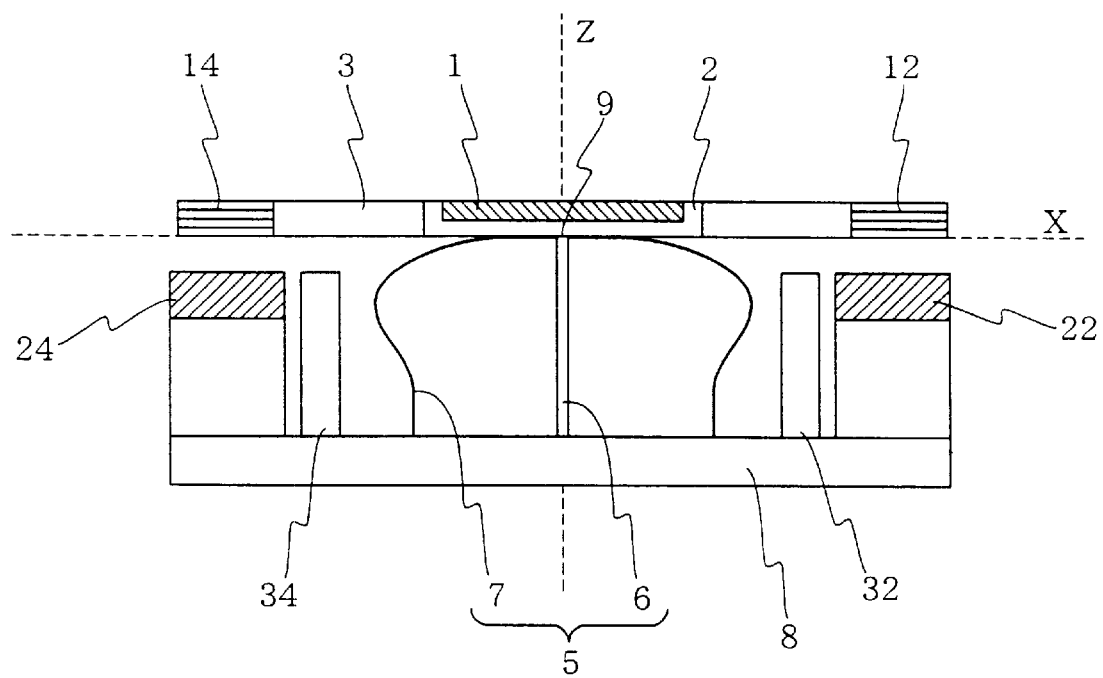
FIG. 2 is a cross sectional side view of the laser pointing apparatus according to the first embodiment (A1).

FIG. 1 is a plan view and FIG. 2 is a cross sectional side view of a laser pointing apparatus according to a first embodiment (A1) of the present invention. For purpose of simplification, FIG. 1 and FIG. 2 do not include a control block which will be detailed later.

The laser pointing apparatus 4 according to the present embodiment includes: a mirror 1 for reflecting a laser beam; and a mirror holder 2 for supporting the mirror 1. The mirror holder 2 is constituted by a mirror holder main body 2A and arms 3 extending in four directions from the mirror holder main body 2A. Moreover, the laser pointing apparatus 4 further includes: four coil magnets 11 to 14 attached to the end of the respective arms; and permanent magnets 21 to 24 arranged to face the coil magnets 11 to 14, respectively.

Furthermore, the laser pointing apparatus 4 includes an elastic support mechanism 5, which can be deformed and has a restoring force, for supporting the mirror holder main body 2A in such a manner that the mirror 1 can move around the X axis and Y axis of the XY plane vertical to the Z axis extending through the mirror center and vertical to the mirror surface.

Moreover, the laser pointing apparatus 4 includes four distance displacement sensors 31 to 34 for detecting a positional displacement in the Z axis direction from the stationary position of the arms 3; and a control block 50 (see FIG. 3) which receives measurement signals from the distance displacement sensors 31 to 34, calculates an angular change of the mirror 1, and performs feed-back control of a current value applied to the coil magnets 11 to 14.

The elastic support mechanism 5 is constituted by, for example, a pivot 6 and a plate spring 7, for maintaining a center 9 of the mirror holder main body 2A at a stationary position with respect to a base 8 so that the center 9 serves as a center of rotation. The combination of the pivot 6 and the plate spring 7 function excellently. The pivot 6 suppresses translation of the center position of the mirror holder 2 in the Z axis direction, whereas the plate spring 7 suppresses translation of the center position of the mirror holder main body 2A in the X axis and Y axis directions.

If the arm 3 becomes longer, the point of action of the force generated between the permanent magnets 21 to 24 and the coil magnets 11 to 14 goes farther from the center serving as the fulcrum, increasing the moment of rotation. However, this also increases the moment of inertia. Accordingly, the arm length is determined by trade-of between the moment of rotation and the moment of inertia.

The mirror 1 reflects a laser beam for pointing on an arbitrary point on a two-dimensional plane. The mirror 1 is, for example, a plane mirror or a curved mirror having a certain curvature. The curvature is determined by the application.

The distance displacement sensors 31 to 34 measure a positional change of the arms 3 so as to indirectly detect an angular change. As a small-size sensor, contact-type sensors such as a differential transformer and an Inductosyn are available on market. However, it is preferable to use a non-contact type sensor not disturbing the mirror operation. More specifically, there can be exemplified an eddy current type displacement sensor and a laser interaction type sensor. Among these sensors, the eddy-current type displacement sensor is most preferable because of its small size and small weight.

Figure 3:
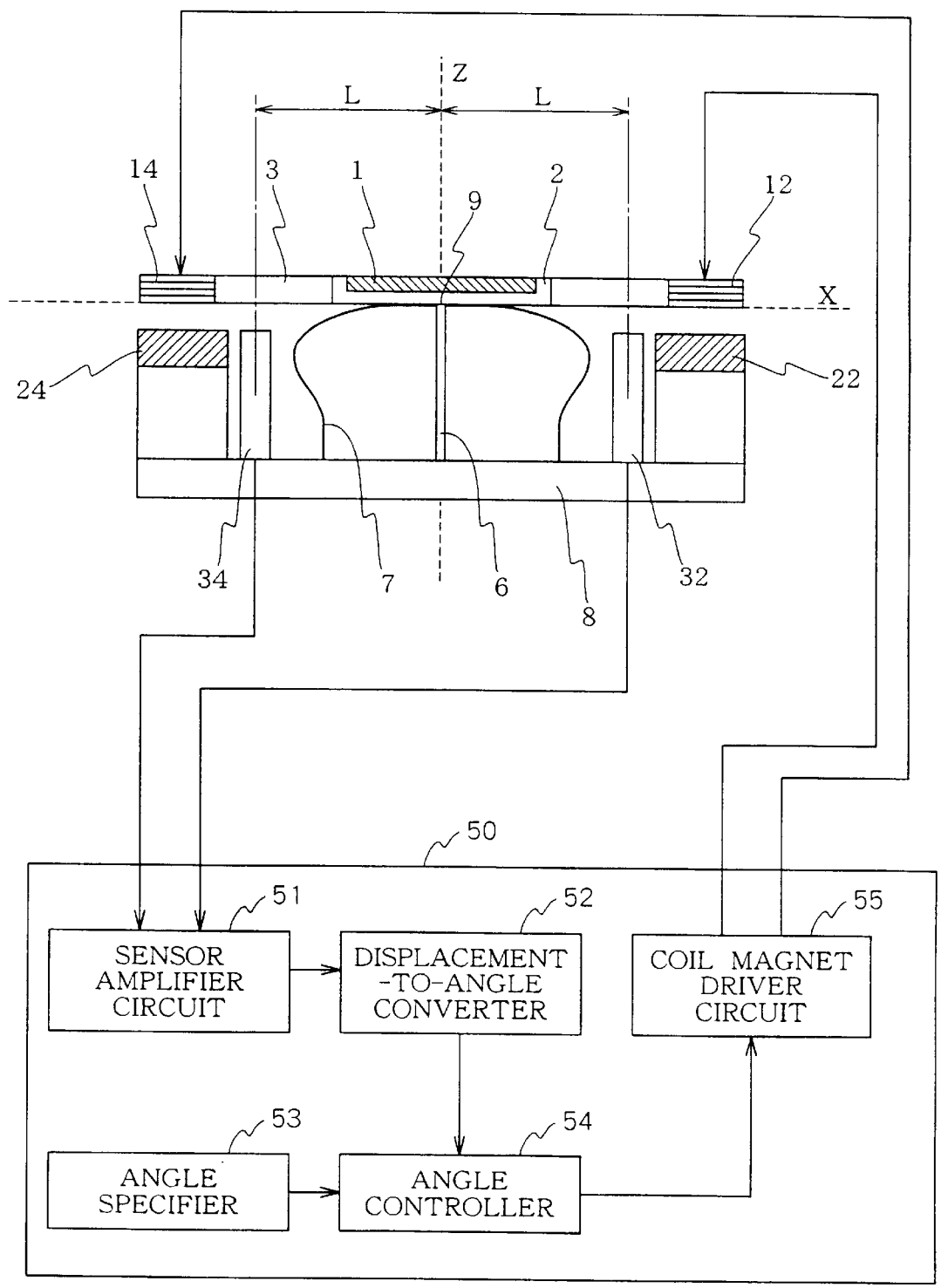
FIG. 3 is a block diagram showing the configuration of the laser pointing apparatus according to the first embodiment (A1).

FIG. 3 is a block diagram showing a configuration of the laser pointing apparatus according to the present embodiment. The control block 50 includes: a sensor amplifier circuit 51 of the distance displacement sensors 31 to 34; displacement-to-angle converter 52 for converting a positional displacement (distance change) into an angular displacement; an angle specifier 53; angle controller 54 which outputs an instruction to adjust the current applied to the coil magnets 11 to 14 according to a difference between the specified angle (specified angular displacement) and the actual angular displacement of the mirror 1; and a coil magnet driver circuit 55 which receives a signal from the angle controller 54 and adjusts the current value to be applied to the coil magnets.

Next, referring to FIG. 3, operation of the present embodiment will be detailed. The permanent magnets 21 to 24 generates a magnetic field around the coil magnets 11 to 14. When current is applied to flow in the coil magnets 11 to 14 by the coil magnet driver circuit 55, a force of Fleming's rule is generated by the magnetic field generated by the permanent magnets 21 to 24 together with the current flowing in the coil magnets 11 to 14. This force serves as the moment of rotation about the rotation center 9. The mirror 1 is displaced in the direction of this moment or rotation and stops at a position where the moment is balanced is with the moment of rotation by the torsion spring characteristic.

For example, when the mirror 1 is to be displaced around the Y axis (in the direction vertical to the paper surface in FIG. 2, an electric current is applied to the coil magnet 12 or 14. Furthermore, by simultaneously applying to the coil magnets 12 and 14 currents having opposite phases to each other, it is possible to generate a moment of rotation in the same direction at the two coil magnets as the points of action, thus enabling to effectively displace the angle of the mirror 1. The angle adjustment of the mirror 1 is performed by the control block 50 which converts a signal from the distance displacement sensors 31 to 34 so as to detect an angular displacement, and adjusts the current to be applied to the coil magnets 11 to 14 according to the detected angular displacement.

Figure 4:
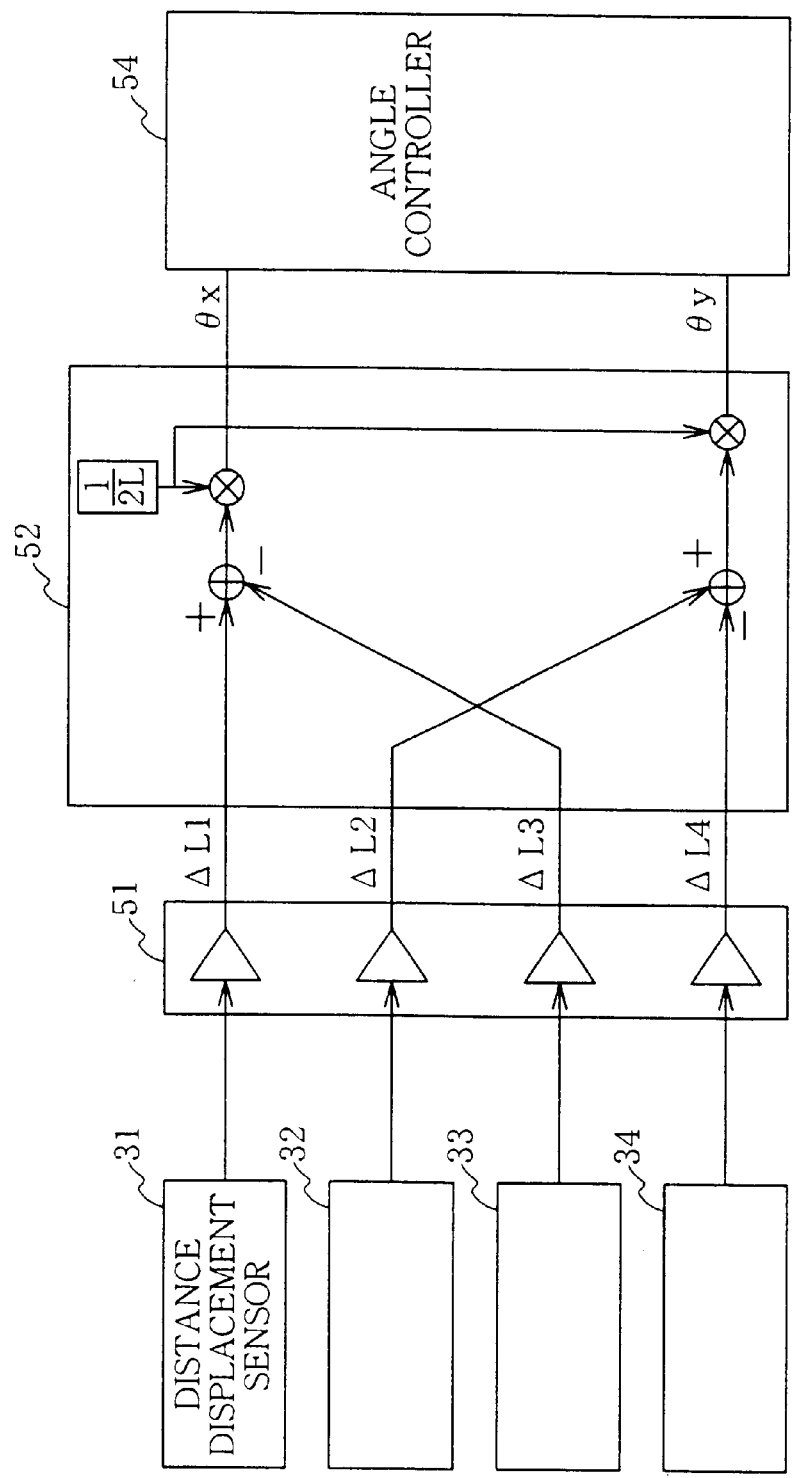
FIG. 4 is a block diagram for explanation of mirror displacement angle calculation by a control block.

FIG. 4 is a block diagram for explaining the procedure for calculating a mirror angular displacement by the control block 50.

Sensor signals obtained by the distance displacement sensors 31 to 34 are respectively converted by the sensor amplifier circuit 51 into distance displacement signals $\Delta L1$ to $\Delta L4$, which are transmitted to the displacement-to-angle converter 52. The displacement-to-angle converter 52 uses these distance displacement signals $\Delta L1$ to $\Delta L4$ to calculate a mirror angular displacement signal indicating a mirror angular displacement and output the obtained signal to the angle controller 54.

In the angle controller 54, if L is the distance between the mirror holder rotation center 9 and a target center of the distance displacement sensor, then the mirror angular displacement signal $\theta x$ around the X axis can be obtained from the following equation:

$$\theta x = (\Delta L1 - \Delta L3)/2L$$

wherein $\Delta L1$ and $\Delta L3$ are distance displacement signals from the distance displacement sensors 31 and 33, respectively. Similarly, the mirror angular displacement signal $\theta y$ around the Y axis can be obtained from the following equation:

$$\theta y = (\Delta L2 - \Delta L4)/2L$$

wherein $\Delta L2$ and $\Delta L4$ are distance displacement signals from the distance displacement sensors 32 and 34, respectively. In this embodiment, these calculations are performed by two adders and four multipliers.

Figure 5:
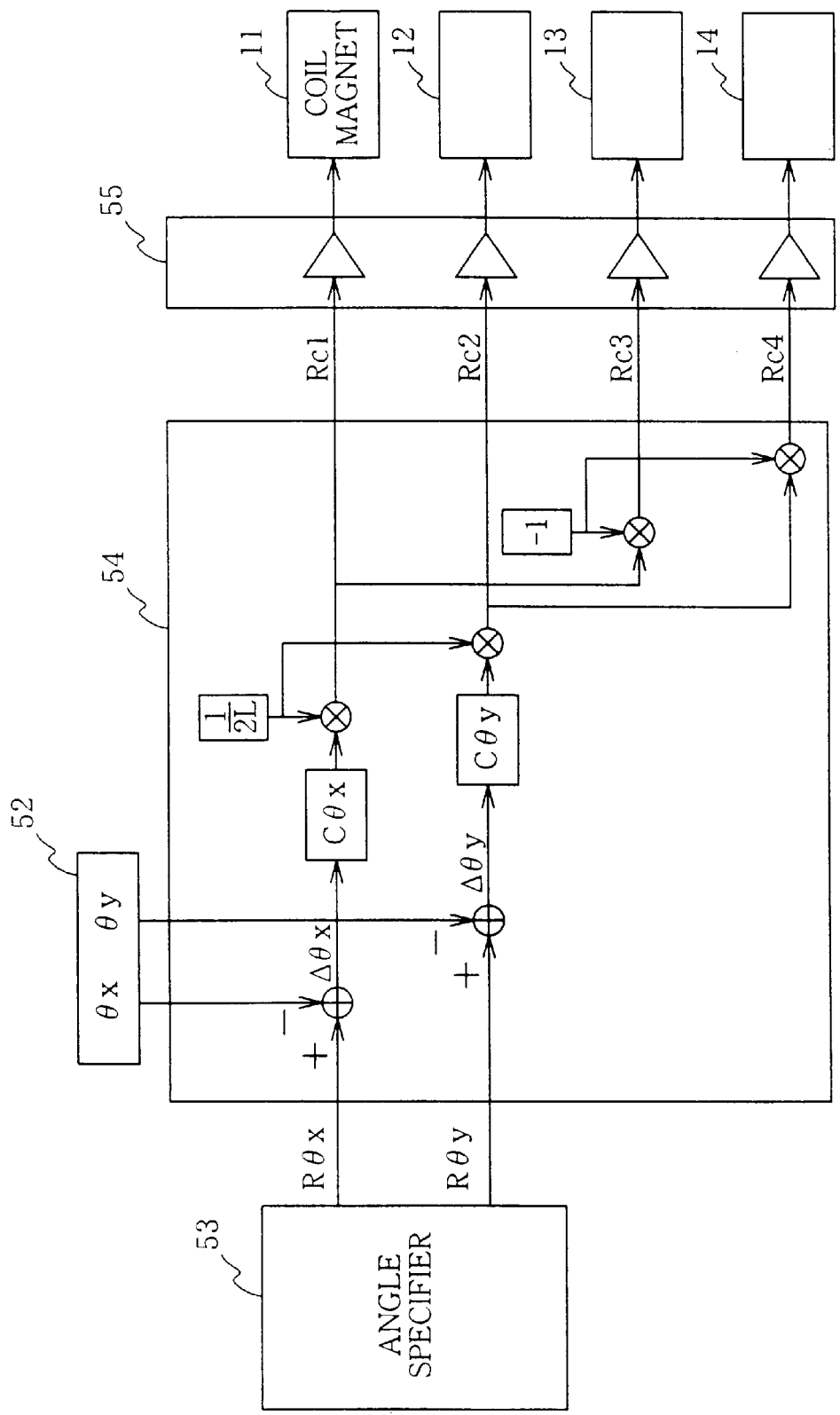
FIG. 5 is a block diagram for explanation of coil current adjustment by the control block.

FIG. 5 is a block diagram explaining operation of coil current adjustment performed by the control block 50. The angle specifier 53 for setting the angle of the mirror 1 transmits to the angle controller 54 mirror setting angle signals $R\theta x$ and $R\theta y$ for setting an angular displacement around the mirror X axis and Y axis. Moreover, as has been described above, the displacement-to-angle converter 52 transmits to the angle controller 54 the mirror angular displacement signal $\theta x$ and $\theta y$ detected around the X axis and Y axis.

Based on these $R\theta x$, $R\theta y$ and $x$, $\theta y$ signals, the angle controller 54 generates signals for adjusting the coil current to be applied to the coil magnets 11 to 14, i.e., coil current instruction signals Rc1 to Rc4 corresponding to the coil magnets 11 to 14. The angle controller 54 outputs the coil current instruction signals Rc1 to Rc4 to the coil magnet driver circuit 55. The coil magnet driver circuit 55 controls the coil current so that the values of the currents flowing in the coil magnets 11 to 14 are matched with the current values transmitted by the coil current instruction signals Rc1 to Rc4.

Hereinafter, explanation will be given on the procedure for calculating the coil current instruction signals Rc1 to Rc4.

In the angle controller 54, firstly, a mirror angle deviation signal is produced from the mirror setting angle signal and the mirror angular displacement signal. The X-axis mirror angle deviation signal $\Delta \theta x$ is obtained as follows:

$$\Delta \theta x = R\theta x - \theta x$$

Similarly, the Y-axis mirror angle deviation signal $\Delta \theta y$ is obtained as follows:

$$\Delta \theta y = R\theta y - \theta y$$

Next, based on the mirror angle deviation signal, a control calculation is performed for adjusting the coil current so as to obtain a coil current required for the adjustment (hereinafter, referred to as a necessary coil current).

Furthermore, the necessary coil current is evenly divided for the coil magnets associated with the X axis and Y axis, generating coil current instruction signals.

The coil magnets 11 and 13 associated with rotation around the X axis correspond to the coil current instruction signals Rc1 and Rc3 which are obtained as follows:

$$Rc1 C\theta x * \Delta\theta x/2$$

$$Rc3 = -C\theta x * \Delta\theta x/2$$

wherein Cθx is a transfer function of the circuit (hereinafter, referred to as a control computing circuit) for calculating the angular displacement around the X-axis. The control computing circuit uses, for example, a PID control circuit and a lead-lag filter (phase lead-lag circuit).

The coil magnets 12 and 14 associated with rotation around the Y-axis correspond to the coil current instruction signals Rc2 and Rc4 obtained as follows:

$$Rc2 = C\theta y * \Delta\theta y/2$$

$$Rc4 = -C\theta y * \Delta\theta y/2$$

Here, Cθy is a transfer function of the control computing circuit for calculating the angular displacement around the Y-axis.

In this embodiment, as shown in FIG. 5, the aforementioned calculations are performed using two adders, two multipliers, and two control computation circuits.

It should be noted that the distance displacement sensors 31 to 34 are arranged at inner positions than the permanent magnets 21 to 24 when viewed from the rotation center 9. However, it the installation space is available, it is possible to extend the arm end positions to reach the outside of the permanent magnets, so that the distance displacement sensors are mounted at outer positions than the permanent magnets. This increases the measurement values obtained by the sensors in response to the mirror angle change, enabling to obtain a higher angle resolution.

<Embodiment A2>

Figure 6:
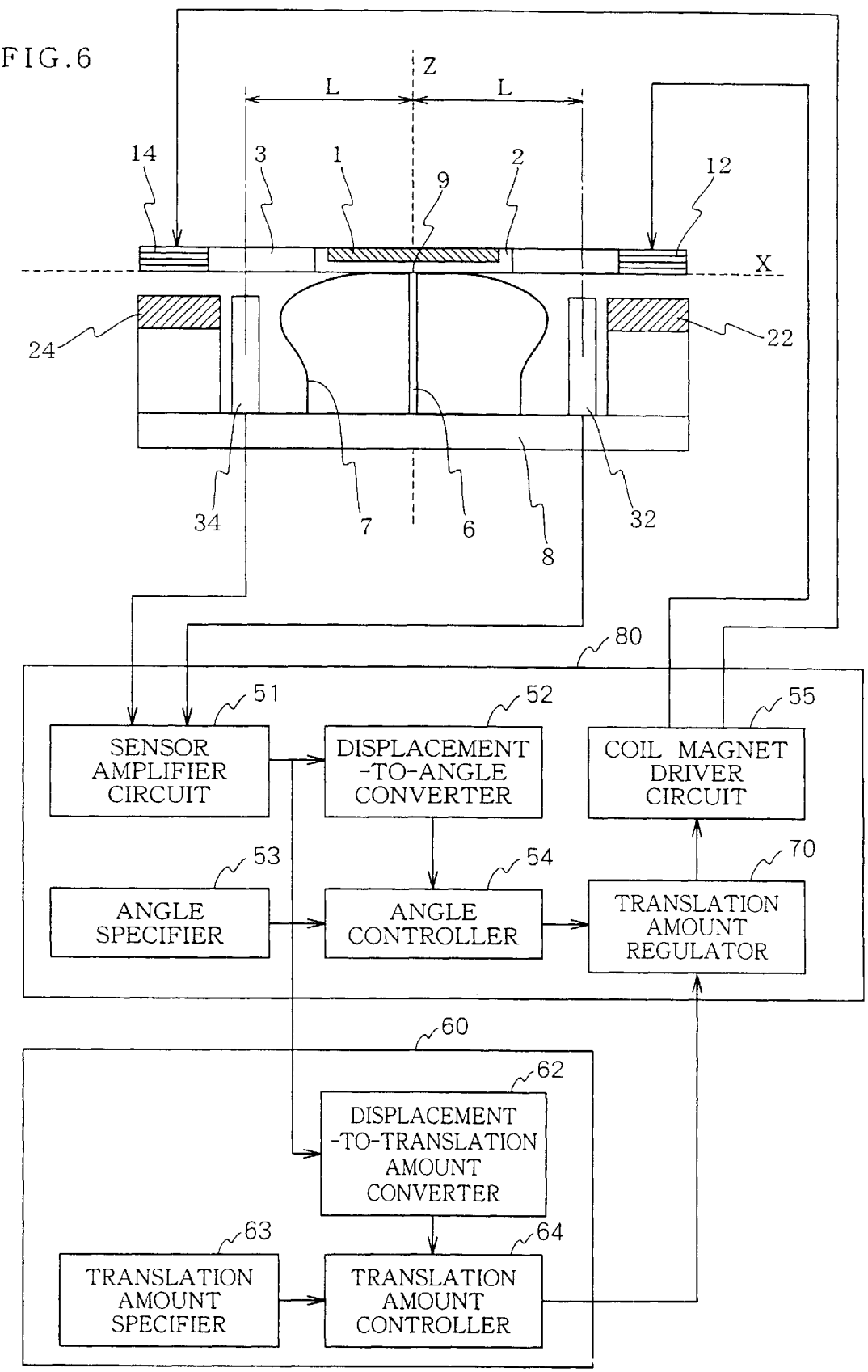
FIG. 6 is a block diagram showing a configuration of a laser pointing apparatus according to a second embodiment (A2).

FIG. 6 is a block diagram showing a configuration of a laser pointing apparatus according 78 to a second embodiment (A2) of the present invention. Unlike the laser pointing apparatus 4 according to the first embodiment (A1), the laser pointing apparatus 78 controls not only the mirror angle about the X and Y axes but also translation in the Z axis direction. Like components as in the first embodiment are denoted with like symbols, and their explanations are omitted.

The laser pointing apparatus 78 includes a control block 80 having an identical configuration as the control block 50 but having a translation amount regulator 70 additionally; and a translation amount control block 60.

The translation amount control block 60 includes: a displacement-to-translation converter 62 for converting a distance displacement in the Z axis direction produced by the sensor amplifier circuit 51, to a translation amount of the mirror 1; a translation amount specifier 63 for specifying a translation amount of the mirror 1; and a translation amount controller 64 for adjusting currents to be applied to the coil magnets 11 to 14 based on the translation amount specified and the actual translation amount.

The translation amount regulator 70 adds a coil current adjustment signal transmitted from the translation amount controller 64, to the coil current instruction signal transmitted from the angle controller 54, so as to generate a new coil current instruction signal, which is transmitted to the coil magnet driver 55.

The angle controller 54 transmits the coil current instruction signal not to the coil magnet driver circuit 55 but to the translation amount regulator 70.

Hereinafter, explanation will be given on the operation of the laser pointing apparatus 78 with reference to the attached drawings.

Figure 7:
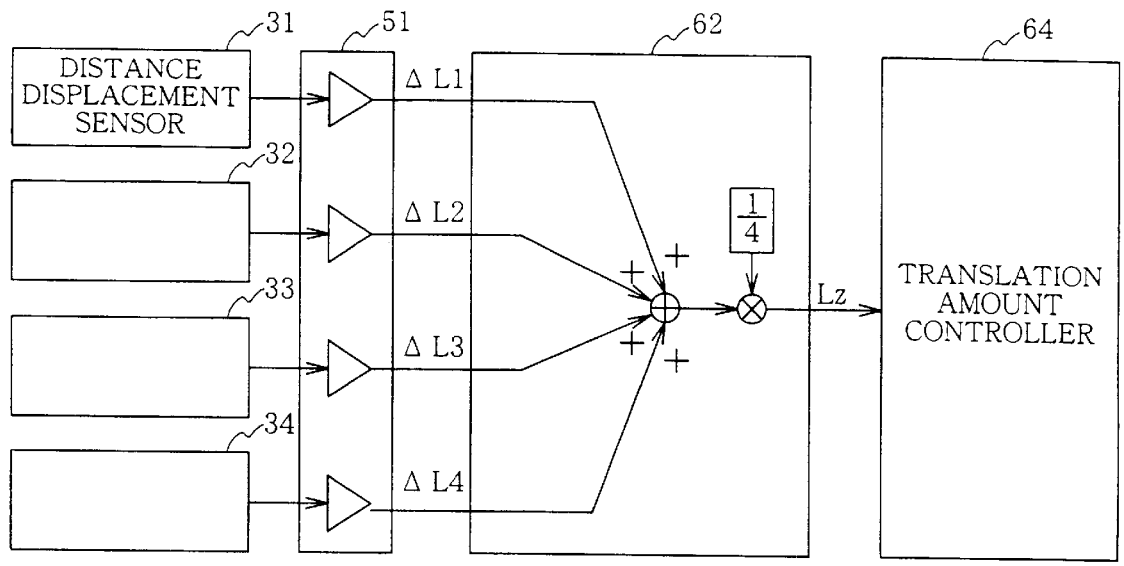
FIG. 7 is a block diagram for explanation of a procedure for detecting a mirror translation amount by a translation amount controller in the second embodiment (A2).

FIG. 7 is a block diagram explaining detection of a mirror translation amount by the translation amount control block 50. The displacement-to-translation amount converter 62 detects (calculates) Z-axis direction displacement signal Lz from the distance displacement signals ΔL1 to ΔL4 (see Embodiment A1) and outputs the result to the translation amount controller 64. The Z-axis direction displacement signal Lz is calculated as follows:

$$Lz = (\Delta L1 + \Delta L2 + \Delta L3 + \Delta L4)/4$$

In this embodiment, as shown in FIG. 7, this calculation is performed by one adder and one multiplier.

Figure 8:
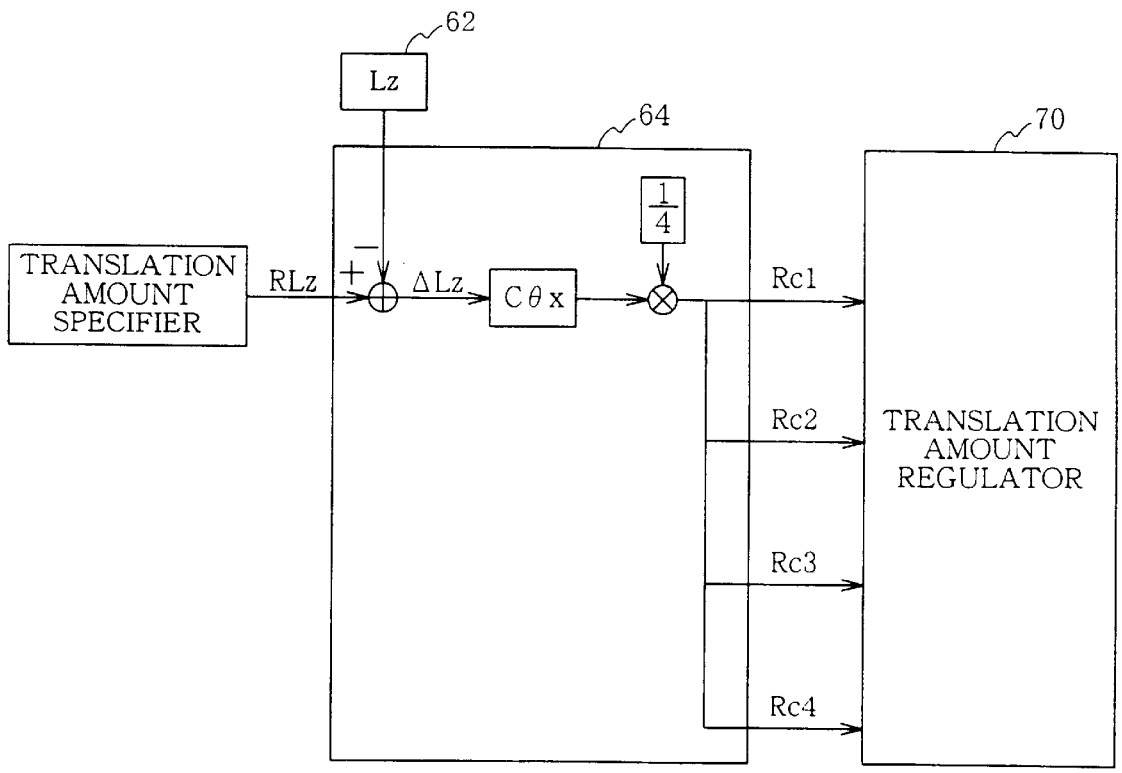
FIG. 8 is a block diagram for explanation of a procedure for adjusting a coil current by the translation amount controller in the second embodiment (A2).

FIG. 8 is a block diagram for explaining the procedure for adjusting the coil current by the translation amount control block 60. The translation amount specifier 63 transmits a Z-axis direction translation amount signal RLz to the translation amount controller 64.

The translation amount controller 64 adjusts the current to be applied to the coil magnets 11 to 14, by generating coil current adjustment signals Rz1 to Rz4 based on the Z-axis direction translation amount signal RLz and the actual translation amount signal Lz. The signals Rz1 to Rz4 are supplied to the translation amount adjustment block 70.

In the translation amount controller 64, the Z-axis direction translation amount signal RLz and the actual translation amount signal Ls are used to obtain a Z-axis direction translation amount deviation signal ΔLz as follows:

$$\Delta Lz = RLz - Lz$$

Next, based on this translation amount deviation signal, a control calculation is performed for the coil current adjustment to determine a coil current required. The necessary coil current is evenly distributed for all of the coil magnets, generating coil current adjustment signals Rz1 to Rz4 corresponding to the coil magnets 11 to 14 are respectively calculated as follows.

$$Rz1 = CLz * \Delta Lz/4$$

$$Rz2 = CLz * \Delta Lz/4$$

$$Rz3 = CLz * \Delta Lz/4$$

$$Rz4 = CLz * \Delta Lz/4$$

Here, Clz is a transfer function of the Z-axis direction displacement control computation circuit. In this embodiment, as shown in FIG. 8, the aforementioned calculations are performed using an adder, a multiplier, and a control computation circuit.

Figure 9:
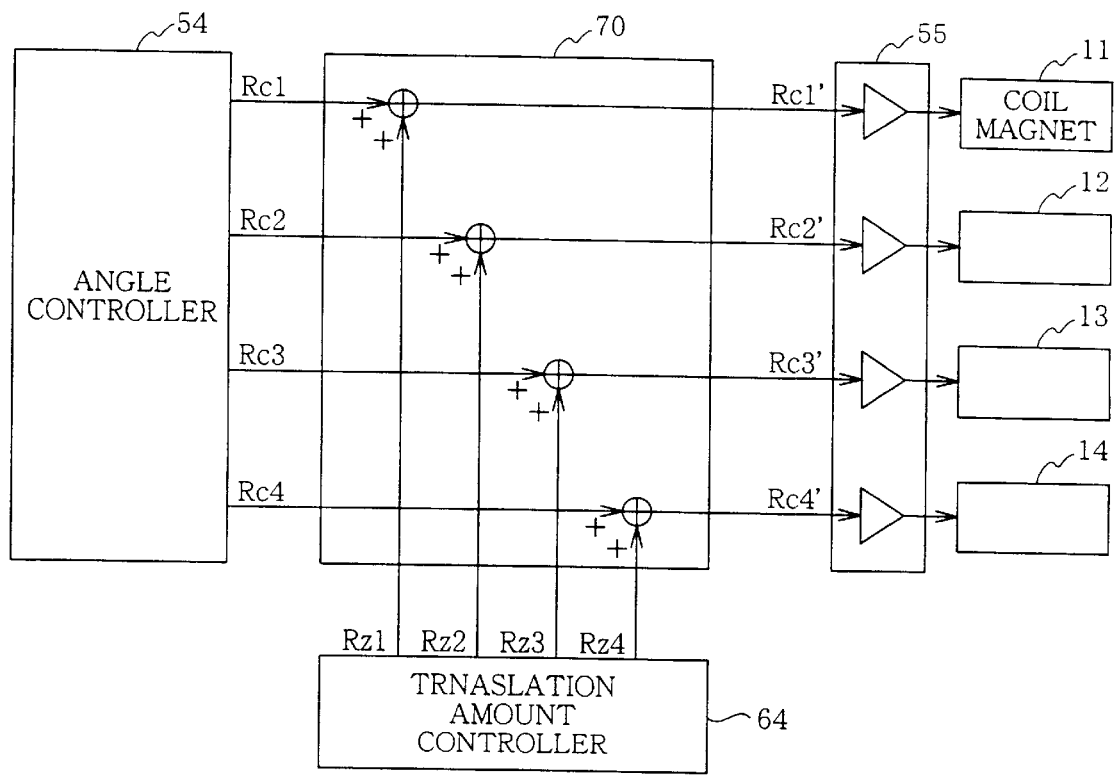
FIG. 9 is another block diagram for explanation of the procedure for adjusting a coil current by the translation amount controller in the second embodiment (A2).

FIG. 9 is a block diagram for explanation of a procedure to adjust the coil current by the translation amount regulator 70. The translation amount regulator 70 uses the coil current instruction signals Rc1 to Rc4 from the angle control means 54 and the coil current adjustment signals Rz1 to Rz4 to generate new coil current instruction signals Rc1' to Rc4' for the coil magnets 11 to 14, respectively. The coil current instruction signals Rc1' to Rc4' are calculated as follows.

$$Rc1' = Rc1 + Rz1$$

$$Rc2' = Rc2 + Rz2$$

$$Rc3' = Rc3 + Rz3$$

$$Rc4' = Rc4 + Rz4$$

In this embodiment, as shown in FIG. 9, these calculations are performed by four adders.

<Embodiment A3>

When a laser pointing apparatus is mounted on a space object such as an artificial satellite, there will arise a problem of heat generated by the apparatus. The laser pointing apparatus according to a third embodiment (A3) has a configuration to cope with this problem.

Figure 10:
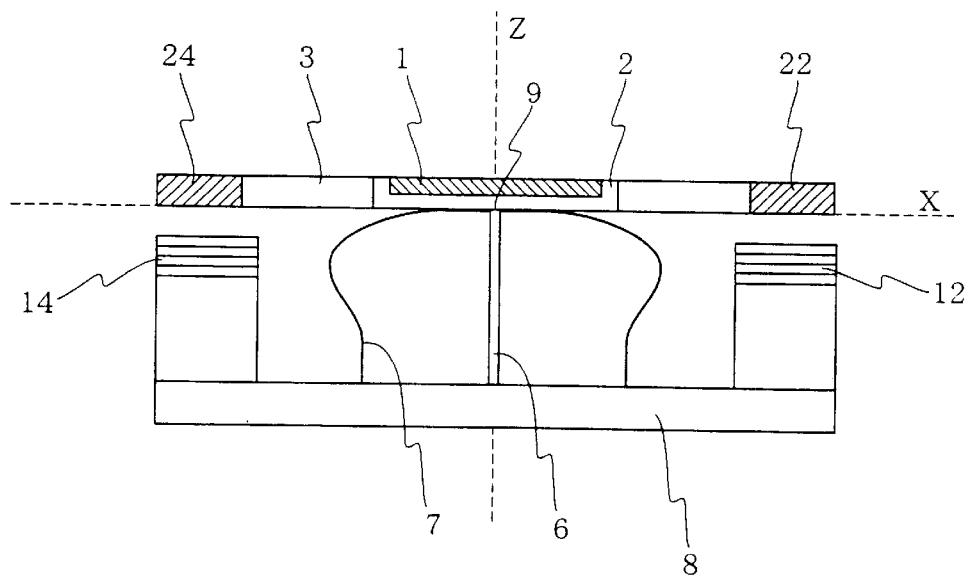
FIG. 10 is a cross sectional side view of a laser pointing apparatus according to a third embodiment (A3).

FIG. 10 is a cross sectional side view of the laser pointing apparatus according to the third embodiment (A3). As shown in FIG. 10, in this embodiment, the positions of the coil magnets 11 to 14 and the positions of the permanent magnets 21 to 24 are interchanged in comparison to the first embodiment (A1).

In the first embodiment (A1), when the laser pointing apparatus 4 on the base 8 is mounted attached to a space object, the heat generated by the coil magnets 11 to 14 can be removed only through a heat conduction path provided by the elastic support mechanism 5. However, the elastic support mechanism 5 structurally has a large heat resistance and the heat is accumulated in the arms 3 and the mirror holder 2, which may cause thermal deformation of the mirror 1.

On the other hand, in the laser pointing apparatus 78 according to the third embodiment, a permanent magnet having a greater mass than a coil magnet is mounted at the end of an arm. This has a disadvantage of increasing the moment of inertia of the arm. However, there is no other heat source than the elastic support mechanism 5 which is in contact with the mirror holder and causes heat conduction to the mirror holder. Accordingly, the possibility of the thermal deformation of the mirror 1 is significantly lowered when compared to the first embodiment. Moreover, the coil magnets 11 to 14 generating heat are mounted on the base 8, so that heat generated in the main body of the space object can easily run away.

Moreover, this embodiment also brings about an effect that wiring is simplified because there is no need of application of current to the movable portion.

The laser pointing apparatus according to the present embodiment is especially useful for an antenna used for communication using laser between satellites or between a satellite and an earth station when transmitting or receiving a laser beam to/from a particular direction.

[B] Description will now be directed to an on-fulcrum movement drive apparatus according to a fourth embodiment (B1) and an on-fulcrum movement drive apparatus according to a fifth embodiments (B2) of the present invention.

<Embodiment B1>

Figure 11:
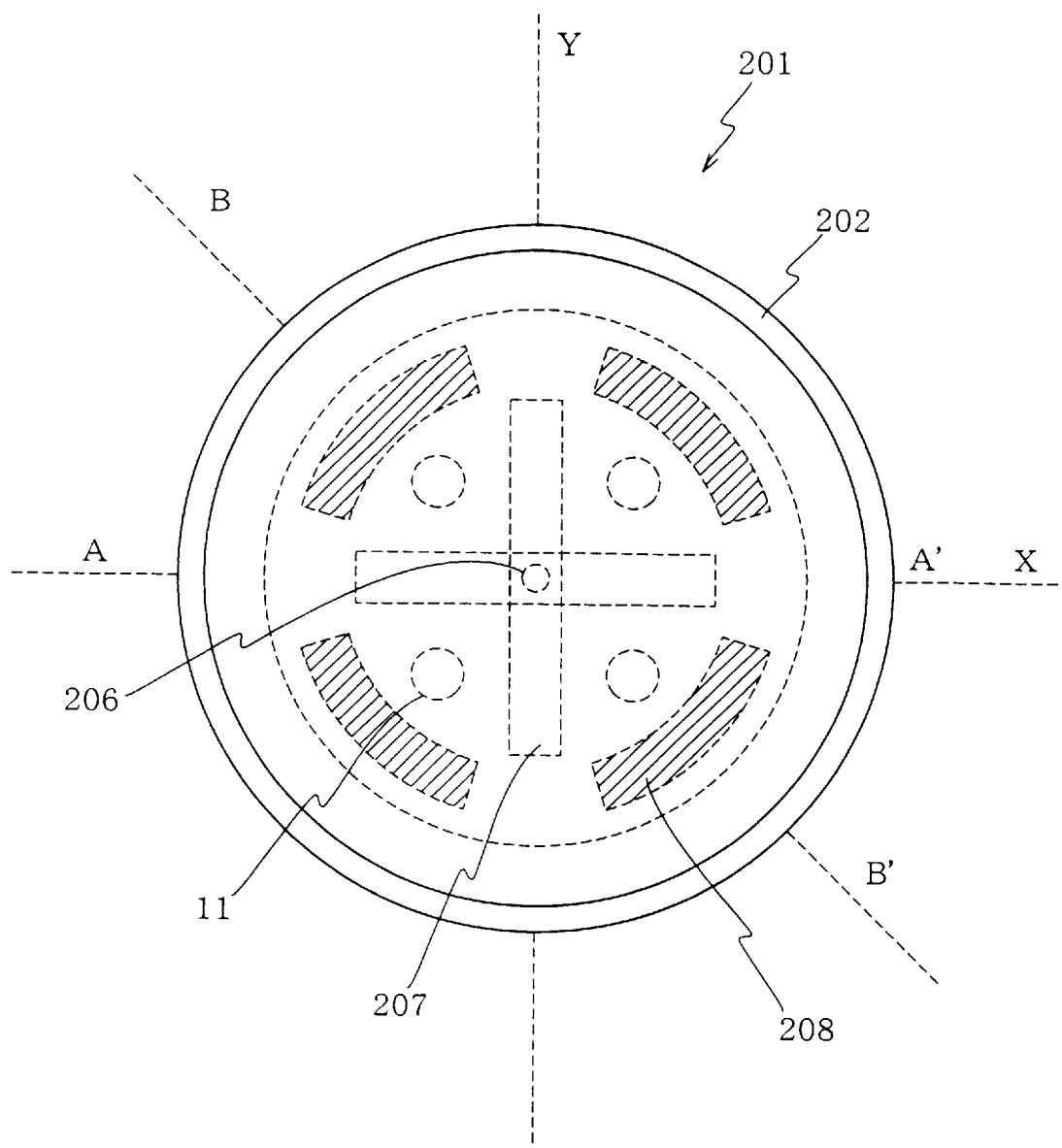
FIG. 11 is a plan view of a positioning mechanism block in an on-fulcrum movement drive apparatus according to a fourth embodiment (B1) of the present invention.
Figure 12:
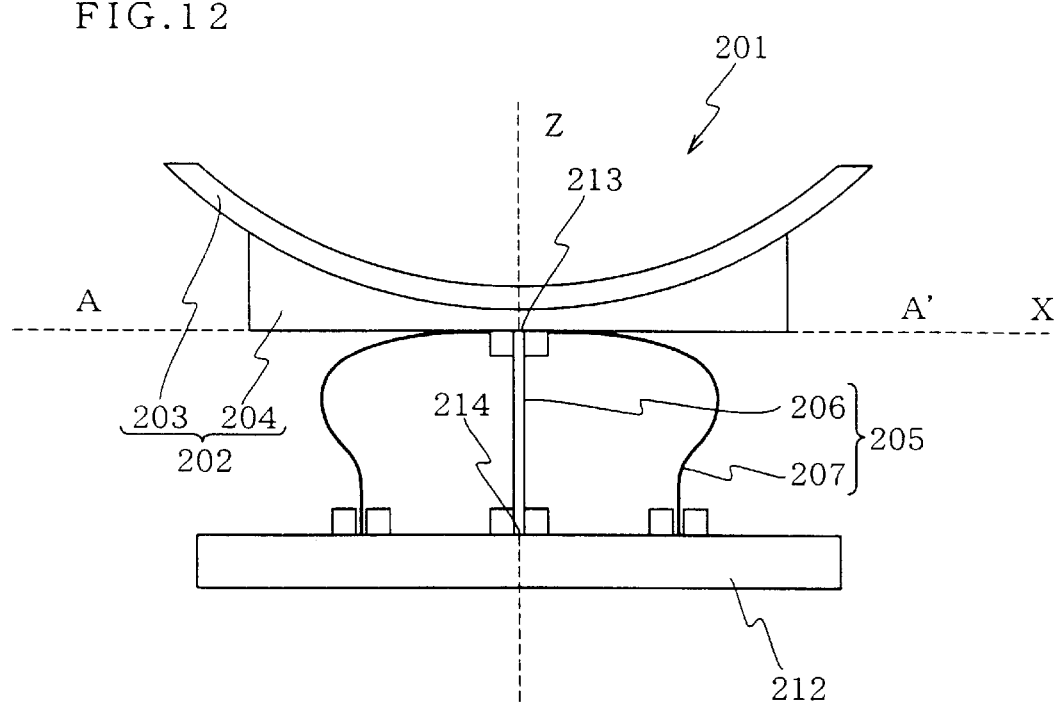
FIG. 12 is a cross sectional side view of the positioning mechanism block about a line AA' in FIG. 11.
Figure 13:
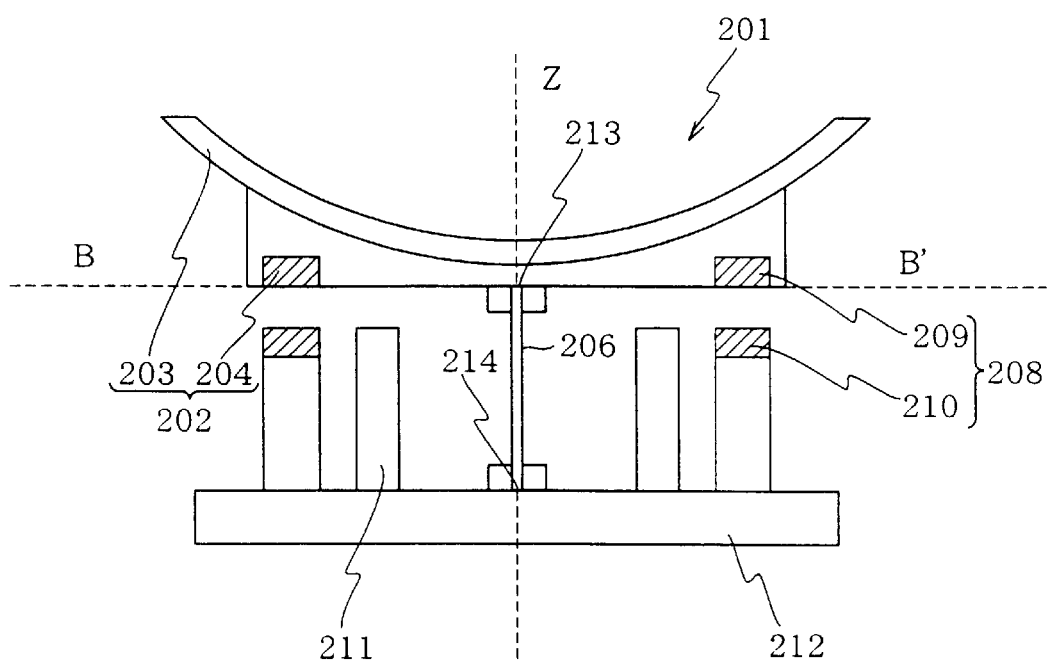
FIG. 13 is a cross sectional side view of the positioning mechanism block about a line BB' in FIG. 11.

FIG. 11 is a plan view showing a configuration of a drive mechanism of the fourth embodiment (B1). FIG. 12 and FIG. 13 are cross sectional side views of the drive mechanism about lines AA' and BB' in FIG. 11, respectively.

As shown in FIG. 11 to FIG. 13, the on-fulcrum movement drive apparatus according to the fourth embodiment (B1) drives to move the antenna 202 and is constituted by an elastic support mechanism 205, an actuator 208, a position sensor 211, and a base 212.

The antenna 202 is constituted by an antenna opening portion 203 having a circular plan view and an antenna seat 204 also having a circular plan view. The antenna 202 is supported through one point of its rear side on an elastic support mechanism 205 so as to be arranged above a base 212.

The elastic support mechanism 205 is made from an elastic material which can be elastically deformed and has a restoring force. The elastic support mechanism 205 supports the antenna seat 204 on the base 212 in such a manner that the antenna 202 can be displaced around the X and Y axes vertically intersecting the Z axis extending through the center of the antenna 202.

More specifically, the elastic support mechanism 205 is constituted by an elastic shaft 206, and a spring having four plate springs 207 according to the present invention. The elastic shaft 206 is made from a non-expandable elastic material not expandable having one end fixed at the center 213 of the antenna seat 204 and the other end fixed at the center 214 of the base 212. The elastic shaft 206 extends straight backward from a position almost corresponding to the center of the antenna 202. On the other hand, the four plate springs 207 have one end fixed at the center 213 of the antenna seat 204 and the other end fixed at four different positions on the base 212, the four positions being at an identical interval from one another and at an identical distance from the center 213 of the antenna seat 204.

The elastic support mechanism 205 having the aforementioned configuration maintains the center 213 of the antenna seat 204 at a predetermined position with respect to the base 212. This predetermined position serves as a fulcrum of movement of the antenna 202. That is, the elastic shaft 206 is non-expandable, which suppresses displacement of the center 213 of the antenna seat 204 in the Z axis direction. Moreover, the four plate springs 207 suppress displacement of the center 213 of the antenna seat 204 in the X and Y axis directions.

It should be noted that in order to effectively suppress displacement of the center 213 of the antenna seat 204 in any of the X, Y, and Z axis directions, it is preferable that the elastic shaft 206 have the smallest expandability in the longitudinal direction and a sufficient spring rigidity both in the bending direction and in the torsion direction. Moreover, the plate springs 207 also preferably have almost no expandability in the longitudinal direction and a comparatively high rigidity both in the bending direction and in the torsion direction.

The actuator 208 serves to generate a moment for moving the antenna 202 around the X and Y about the fulcrum at the center 213 of the antenna seat 204. In this embodiment, the on-fulcrum movement drive apparatus 201 has four actuators 208 arranged along the outer circumference of the antenna seat 4 almost at an identical interval at the back of the antenna 202. Each of the actuators 208 includes a permanent magnet 209 of an arc shape attached to the antenna seat 204 and a coil magnet 210 attached to the base 212 at a position to oppose to the permanent magnet 209 and at a predetermined distance from the permanent magnet 209.

As a small-size actuator, there can be exemplified a piezoelectric element, linear motor, rotary type motor in combination with a ball bearing screw, or a permanent magnet in combination with a coil magnet. For performing a fine positioning, what is important is that a non-linear external disturbance will not be easily caused. For this, the non-contact type actuator constituted by the permanent magnet 209 and the coil magnet 210 has an excellent characteristic.

Moreover, the coil magnet 209 generates a heat when subjected to current. If heat radiation is not sufficient, accumulated heat causes thermal distortion of the antenna 202 to be drive. For this, in the present embodiment, considering heat radiation in the outer space, the permanent magnets 209 are arranged on the antenna side and the coil magnets 210 are arranged on the base 212, so that a heat generated by the coil magnets 210 can easily run away through the bases 212 to a main body of a space object. It should be noted that if it is possible to assure a sufficient heat radiation from the antenna seat 204 by using a some kind of method, the position of the permanent magnets 209 and the position of the coil magnets 210 may be interchanged.

The position sensor 211 measures a positional change of the antenna seat 204 so as to detect indirectly the angle change of the antenna 202. The present embodiment employs four position sensors 211. The position sensors 211 are eddy-current type displacement sensors for detecting a position in non-contact state. The position sensors 211 are arranged at an interval from each other at the back of the antenna seat 204 and at a predetermined distance from the antenna seat 204, so as to determine a distance up to the antenna seat 204. Each of the position sensors 211 extends from the base 212 and is arranged between the center 213 of the antenna seat 204 and the respective actuators 208, and at a position nearer to the actuators 208. When the antenna is at its stationary position before movement, the distances from the respective sensors to the rear surface of the antenna seat 204 are approximately identical.

There are also contact-type sensors such as a differential transformer and an Inductosyn. However, for controlling a highly accurate positioning, it is preferable to use non-contact type sensors not causing an external disturbance during antenna drive. As the non-contact type sensors, there can be exemplified an eddy-current type displacement sensor, a laser interaction type sensor, a reflected light detecting type optical fiber sensor, and the like. Among these sensors, the eddy-current type displacement sensor used in the present embodiment is most preferable because the sensor portion is small in size and weight.

The on-fulcrum movement drive apparatus 201 according to the present embodiment further includes a control block 220 which receives a measurement signal from the position sensor 211 and calculates an angle change of the antenna 202 for feed-back control of a current value to be applied to the coil magnets 210.

Figure 14:
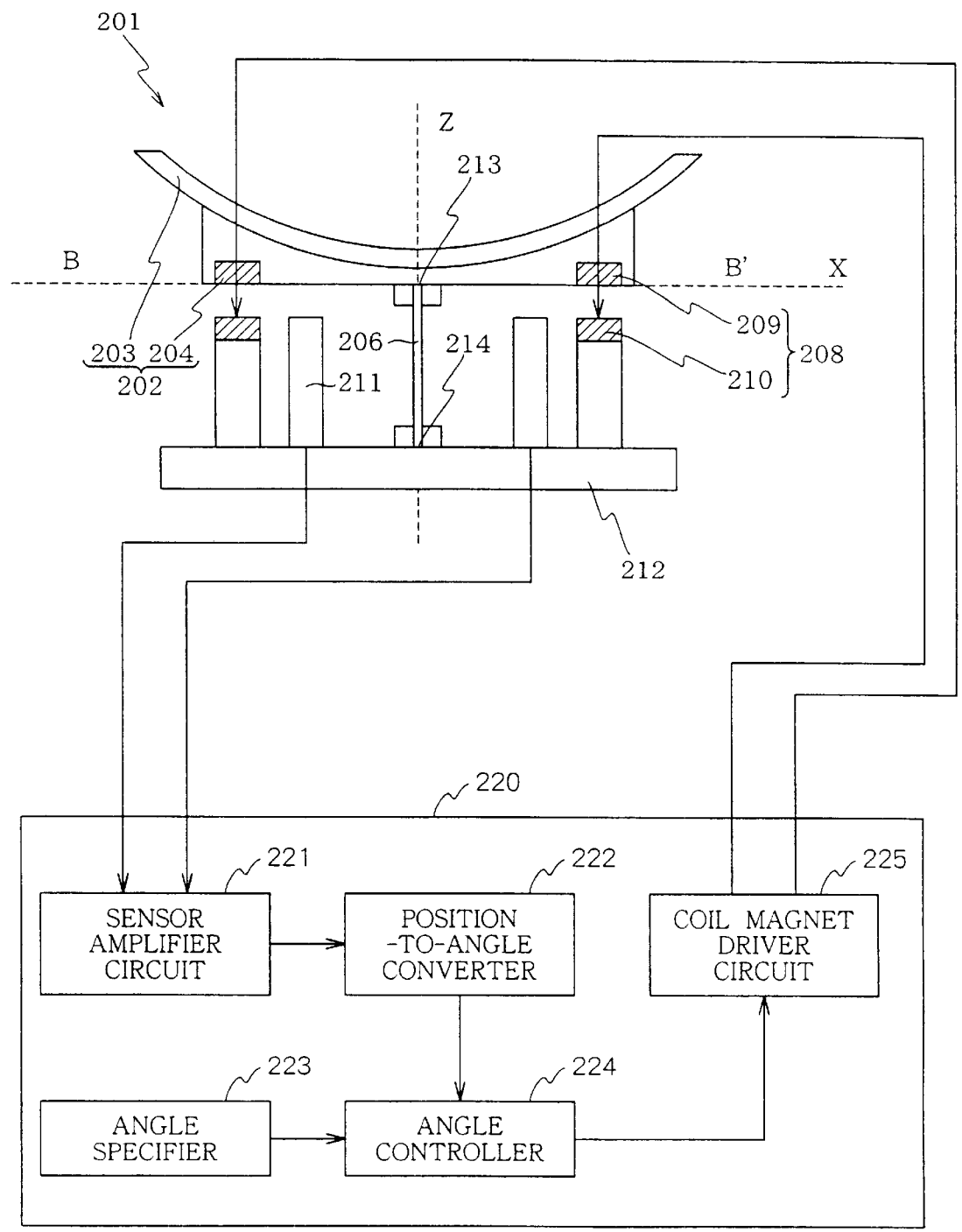
FIG. 14 shows the positioning mechanism block in the on-fulcrum movement drive apparatus according to the fourth embodiment (B1) in relation to a configuration of a control block.

FIG. 14 is a block diagram showing a configuration of the control block 220 together with the positioning drive mechanism according to the present embodiment.

The control block 220 includes: a sensor amplifier circuit 221 of the position sensor 211; position-to-angle converter 222 for converting a position change detected by the sensor amplifier circuit 221, into an angular displacement of the antenna 202; an angle specifier 223 for specifying an angle of the antenna 202; angle controller for adjusting a current to be applied to the coil magnets 209 based on a difference between a specified angle and an actual angle of the antenna 202; and a coil magnet driver circuit 225 for applying the adjusted current to the coil magnets 210.

Next, explanation will be given on the operation of the on-fulcrum movement drive apparatus 201 with reference mainly to FIG. 14.

Firstly, explanation will be given on the principle of driving the antenna 202 by the actuator 208. Around the coil magnets 210 constituting the actuator 208, a magnetic field is generated by the permanent magnets 209. Accordingly, when a current from the coil magnet driver circuit 225 is applied to the coil magnet 210, the magnetic field generated by the permanent magnet 209 interacts with the current flowing through the coil magnet 210, generating a force according to the Fleming's rule.

If currents having opposite phases are applied to two coil magnets 209 located at opposing positions to sandwich the center 213 of the antenna seat 204, the force acting on the coil magnets 209 serves as a moment of rotation around the X or Y axis having the fulcrum at the center 213 of the antenna seat 204. Here, the force acting on the coil magnets 209 also causes the elastic shaft 206 to act as a cantilever having the fulcrum at the center 214 of connection with the base 212. However, simultaneously with this, the restoring force of the plate spring 207 acts strongly. Actually, the center 213 of the antenna seat 204 will not be moved in the X or Y axis direction in practice.

On the other hand, when currents of identical phase are applied to two opposing coil magnets sandwiching the center 213 of the antenna seat 204, there is generated a force to displace the antenna 202 in the Z axis direction. However, the antenna 202 is connected to the base 212 via the elastic shaft 206 having a sufficient rigidity in its longitudinal direction. Accordingly, the center 213 of the antenna seat 204 will not be displaced practically. Thus, the antenna 202 to be driven is displaced around the X and Y axes by the moment of rotation about the fulcrum at the center 213 of the antenna seat 204 until balanced with a reverse-direction moment generated by the torsion spring characteristic of the elastic support mechanism 205.

Next, explanation will be given on control of angular displacement of the antenna 202. Angular adjustment of the antenna 202 is performed in the control block 220 by using signals from the four position sensors 211, which are converted into an angular displacement. According to this angular displacement detected, the currents to be applied to the four coil magnets 210 are adjusted. The sensor signals obtained by the four position sensors 211 are supplied to the sensor amplifier circuit 221 of the control block 220 where the signals are converted into position displacement signals $\Delta Ln$ (n=1 to 4), which are supplied to the position-to-angle converter 222.

The position-to-angle converter 222 detects from the position displacement signals $\Delta Ln$ angular displacement signals $\theta x$, $\theta y$ indicating the angle of movement of the antenna 202 around the X and Y axes. The angular displacement signals $\theta x$, $\theta y$ are supplied to the angle controller 224. On the other hand, the angle specifier 223, which specifies an angle of the antenna 202, supplies to the angle controller 224 with an antenna angle signal $R\theta x$ specifying an angle around the X axis and an antenna angle signal $R\theta y$ specifying an angle around the Y axis.

The angle controller 224 performs a angle control calculation using the antenna displacement signals $\theta x$, $\theta y$ supplied from the position-to-angle-converter 222 and the antenna angle signal $R\theta x$ and $R\theta y$ supplied from the angle specifier 223, so as to generate coil current instruction signals $RCn$ (n=1 to 4), which are supplied to the coil magnet driver circuit 225 for adjustment of currents to be applied to the respective coil magnets 210.

The coil magnet driver circuit 225 controls the coil currents so that the currents flowing in the coil magnets 210 are matched with the coil current instruction signals $RCn$. As a result, an appropriate current is applied to each of the coil magnets 210, generating a necessary moment between the coil magnets 210 and the permanent magnets 109, so as to position the antenna 202 at an angle where the moment is balanced with the torsion spring characteristic of the elastic support mechanism 205.

In the on-fulcrum movement drive apparatus 201 according to the present embodiment, the antenna 202 to be driven is fixed to the elastic support mechanism 205. Accordingly, no fluctuation or friction is caused as when a spherical bearing is used, or no non-linear external disturbing component is involved in the control system during drive. Therefore, it is possible to control the angle of the antenna 202 with a high accuracy.

Moreover, no lubricant is required as in the case of spherical bearing. Consequently, the on-fulcrum movement drive apparatus 202 according to the present invention has no problem of lubricant evaporation and can also be used in a vacuum, especially in an outer space.

It should be noted that the arrangement of the plate springs 207, the actuators 208, and the position sensors 211 are not to be limited to the arrangement of the present embodiment but can be modified in various ways.

Figure 15:
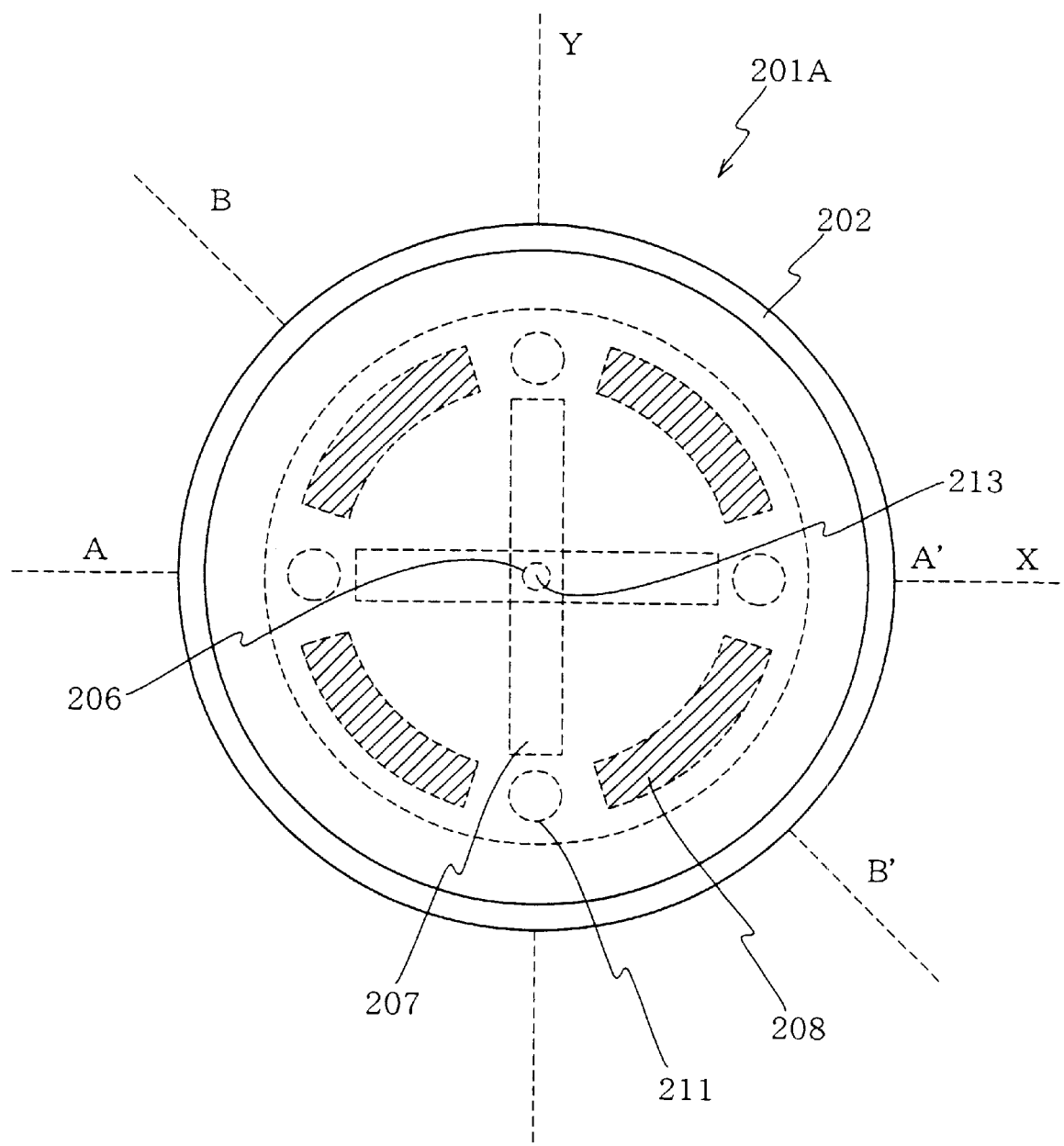
FIG. 15 is a plan view of a modification of the on-fulcrum movement drive apparatus according to the fourth embodiment (B1).

FIG. 15 is a plan view of a modified example of the fourth embodiment (B1). Like components are denoted by like symbols as in FIG. 11 to FIG. 14.

Unlike the on-fulcrum movement drive apparatus 201, the on-fulcrum movement drive apparatus 201A shown in FIG. 15 has four position sensors 211 respectively arranged between two adjacent actuators 208. In this arrangement, it is possible to obtain a longer distance between the center 213 of movement (rotation) to the position sensors 211 than in the arrangement of FIG. 11. This enables to obtain a greater detection value by the position sensors for an angular change of the antenna 202. Accordingly, when using position sensors of an identical position resolution, it is possible to obtain a higher angle resolution. Consequently, it is possible to obtain a further higher accuracy in controlling the angle of the antenna 202.

It should be noted that in this case the position of actuators is at 45 degrees with respect to the position sensors on the X-Y plane. This angular shift can easily be corrected by the angle controller 224.

Figure 16:
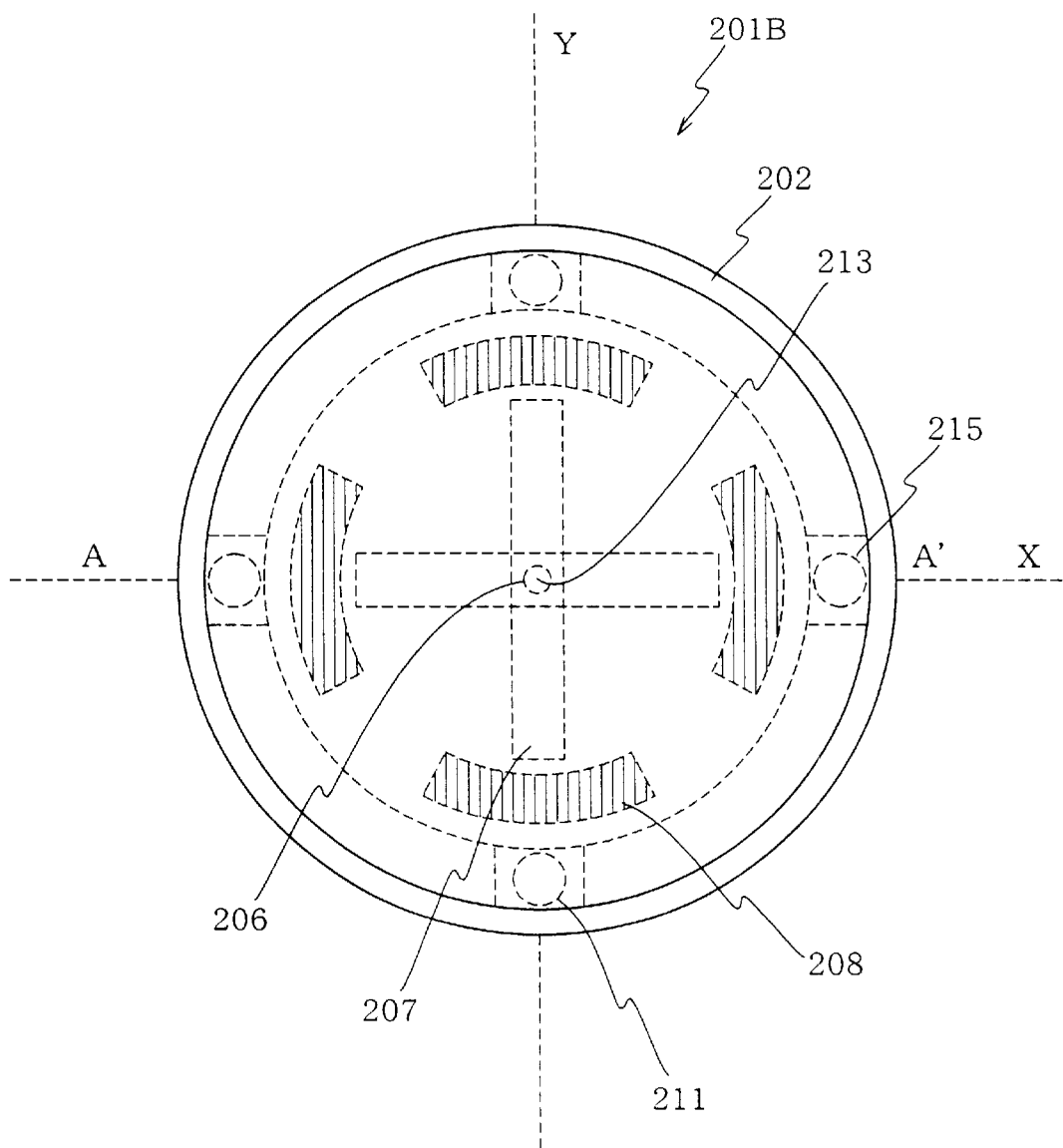
FIG. 16 is a plan view of another modification of the on-fulcrum movement drive apparatus according to the fourth embodiment (B1).
Figure 17:
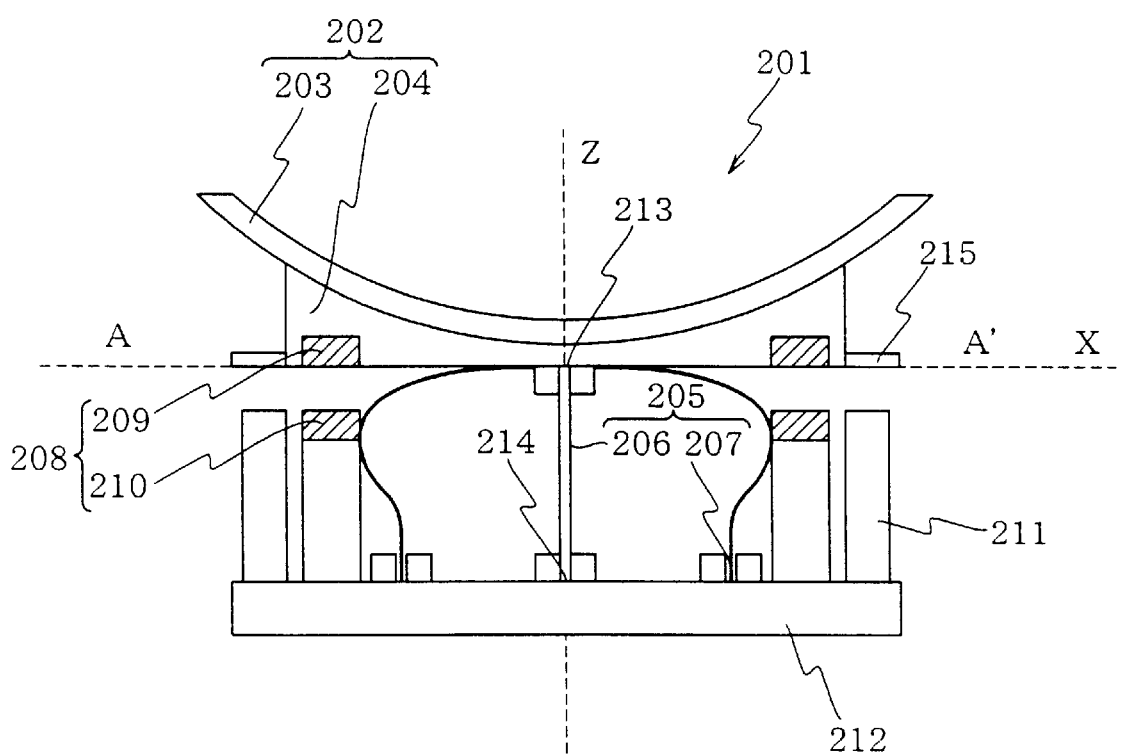
FIG. 17 is a cross sectional view about the line AA' in FIG. 16.

FIG. 16 is a plan view of another modified example of the fourth embodiment of the present invention. FIG. 17 is a cross sectional side view about the line AA' in FIG. 16. Like components as in FIG. 11 to FIG. 14 are denoted by like symbols.

The on-fulcrum movement drive apparatus 201B shown in FIG. 16 and FIG. 17, in order to obtain a further longer distance from the center 213 of the antenna seat 204 to the position sensor 211, the position sensor is arranged outside of the actuator 208. More specifically, the arm 215 is extended from the antenna seat 204 in the radial direction so as to be a target of the sensor arranged on the outer position of the antenna seat 204.

This arrangement further increases the detection displacement of the position sensor 211 with respect to an angular change of the antenna 202 in comparison to the arrangement of FIG. 15. When using position sensors of identical position resolution, it is possible to obtain a higher angle resolution. Moreover, in this case, the actuator 208 and the position sensor 211 are arranged on an identical radial line and there is no need of a particular correction processing in the angle controller 224.

<Embodiment B2>

Description will now be directed to an embodiment B2 of the present invention.

Figure 18:
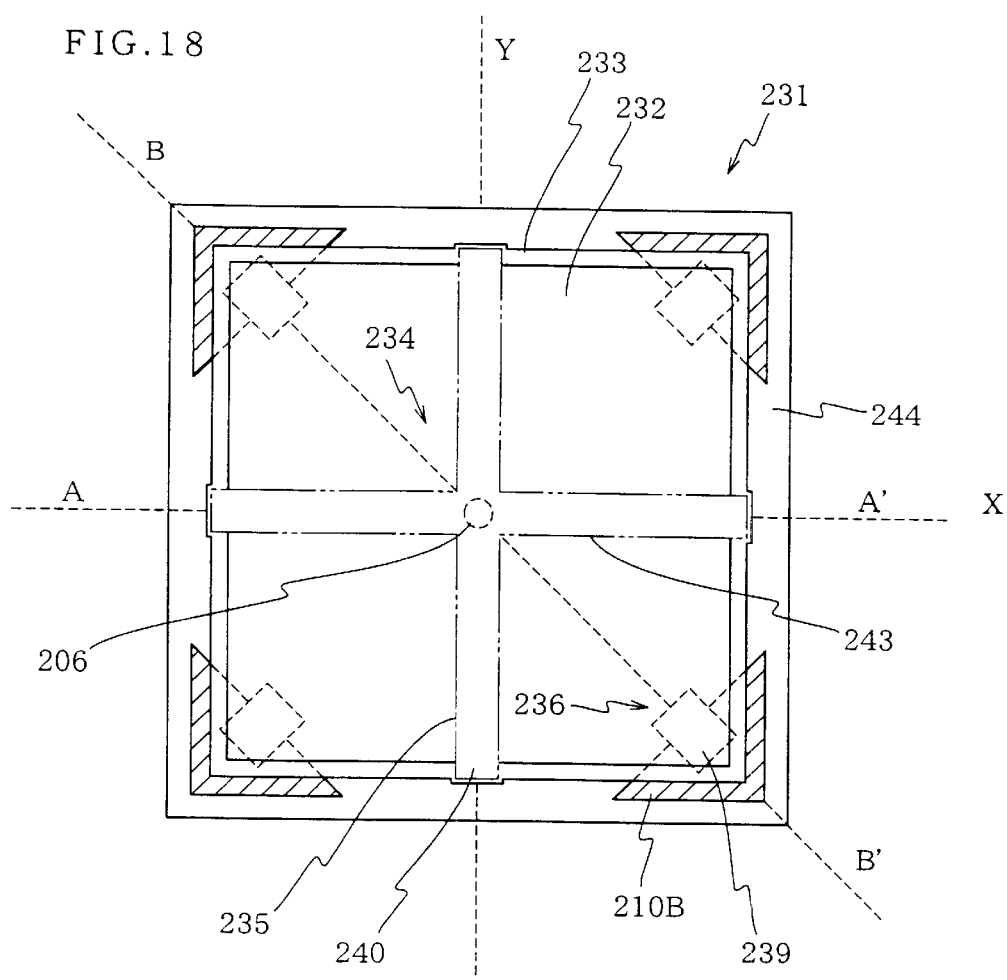
FIG. 18 is a plan view of an on-fulcrum movement drive apparatus according to a fifth embodiment (B2) of the present invention.
Figure 19:
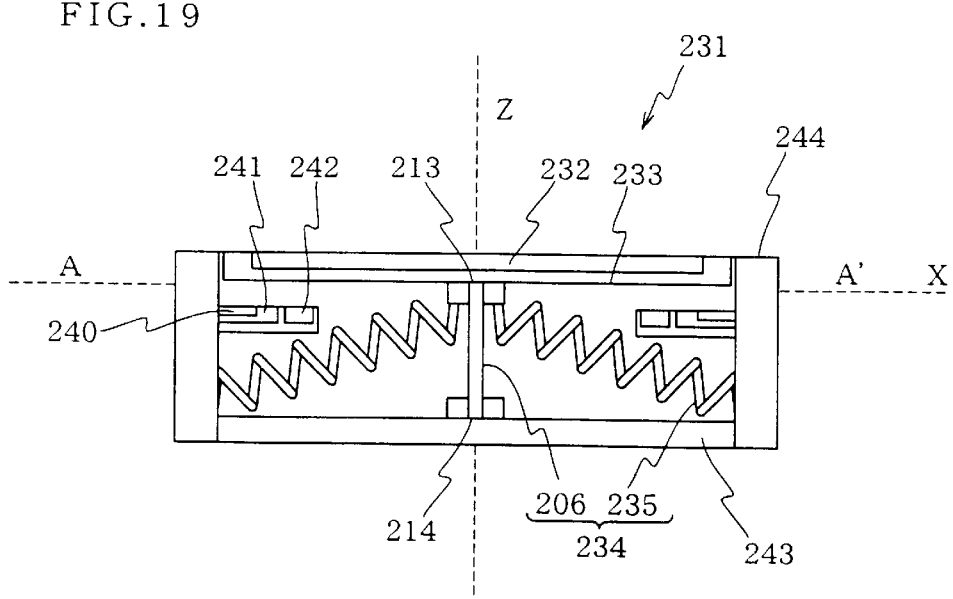
FIG. 19 is a cross sectional side view about the line AA' in FIG. 18.
Figure 20:
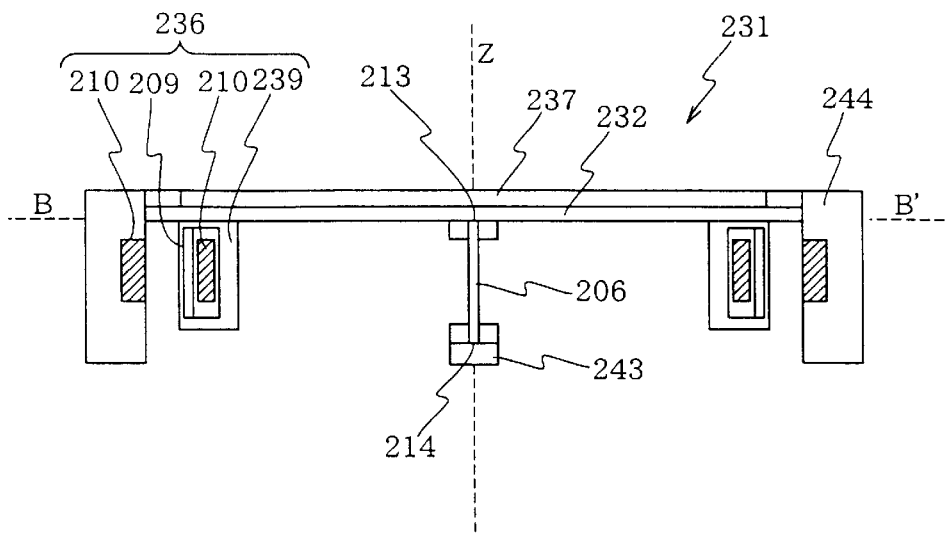
FIG. 20 is a cross sectional side view about the line BB' in FIG. 18.
Figure 21:
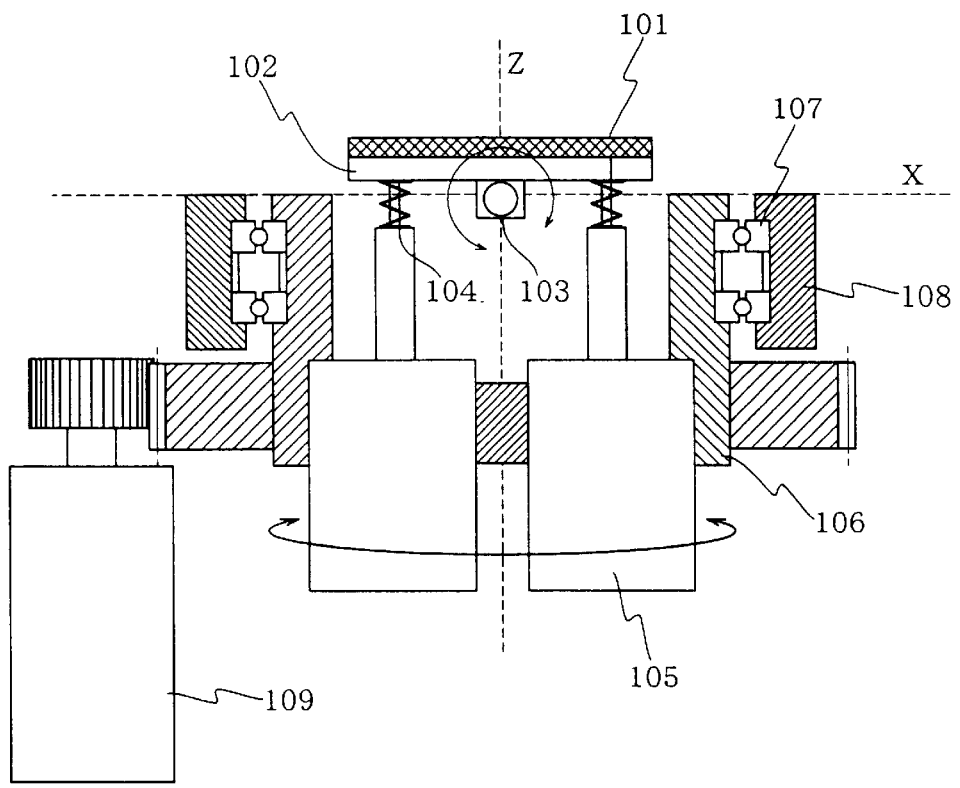
FIG. 21 is a cross sectional side view of a conventional laser pointing apparatus.
Figure 22:
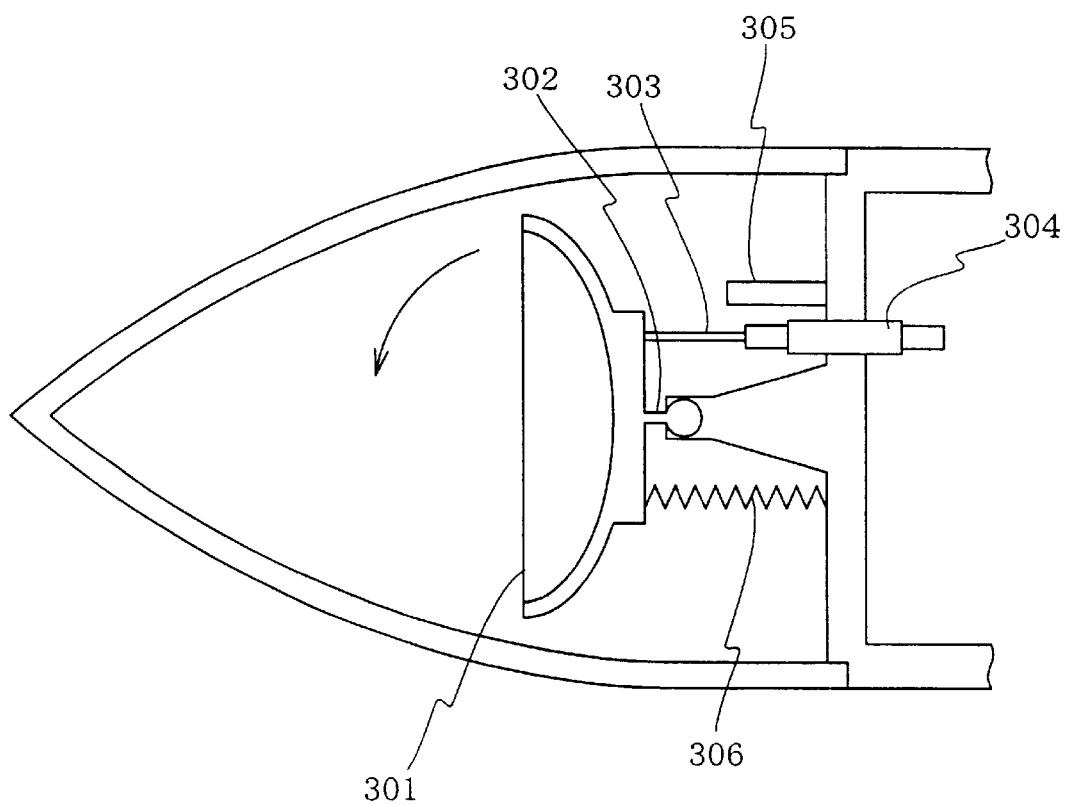
FIG. 22 is a cross sectional side view of a conventional on-fulcrum movement drive apparatus.

FIG. 18 is a plan view showing a configuration of an on-fulcrum movement drive apparatus according to the embodiment B2 of the present invention. FIG. 19 is a cross sectional side view of the on-fulcrum movement drive apparatus about the line AA' in FIG. 18, and FIG. 20 is a cross sectional side view of the apparatus about line BB' in FIG. 18. Like components as in FIG. 11 to FIG. 13 are denoted by like symbols.

The on-fulcrum movement drive apparatus 231 shown in FIG. 18 to FIG. 20 differs from the on-fulcrum movement drive apparatus 201 in that at the back of the object to be driven, there is provided a wide open structure for facilitating inspection and repair of the object to be driven.

More specifically, in the on-fulcrum movement drive apparatus 231, the actuators 346, the position sensors 240 (FIG. 19), and the elastic support mechanism 234 are supported on side walls 244 of a frame instead of on the base as in the on-fulcrum movement drive apparatus 201. Note that the elastic shaft 206 (FIG. 19) is fixed on a beam bridging the walls as will be detailed later.

In this embodiment, the object to be driven is assumed to be a plane mirror 232 having a square shape when viewed from the top, which is held by a mirror holder 233 having a square shape when viewed from the top.

The on-fulcrum movement drive apparatus 231 is mounted on a frame having four side walls 244 surrounding the mirror holder 233; and fixed beams bridging two opposing side wall 244. Each of the fixed beams 243 extends to connect the center of the respective walls in the length direction and has two ends fixed at the lower end of the walls.

The elastic support mechanism 234 is constituted by an elastic shaft 206 and coil springs 235 which replace the aforementioned plate springs. The elastic shaft 206 has one end fixed to the center of the back of the mirror holder 233 and the other end fixed at the center of the fixed beam 243.

On the other hand, each of the coil spring has one end fixed to the connection portion between the elastic shaft 206 and the mirror holder 233 and the other end fixed to the side wall 244 at a position near to the lower end of the side wall 244

The coil spring 235 is preferably has a sufficiently high rigidity in the longitudinal direction and a comparatively high spring rigidity both in the bending direction and the torsion direction, so as to suppress movement of the center position of the mirror holder 233 in the X or Y axis direction.

As shown in FIG. 18 and FIG. 20, each of the four actuators 236 includes a permanent magnet 209B, a coil magnet 210B, and a yoke 239. The four yokes 239 are arranged at the four corners of the mirror holder 233 and have upper ends connected to the back of the mirror holders 233.

As shown in FIG. 20, the permanent magnet 209B is fixed inside the yoke 239 so as to extend in a direction approximately vertical to the rear surface of the mirror holder 233. On the other hand, the coil magnet 210B is arranged half in a through hole 239A formed in the yoke 239 and half embedded in the side wall 244 so as to surround the permanent magnet 209B. It should be noted that an appropriate clearance is formed between the coil magnet 210B and the permanent magnet 209B and the yoke 239.

The yoke 239 together with the permanent magnet 209B constitutes a magnetic circuit so as to increase the magnetic flux density of a magnetic field thrusting through the coil magnet 210B. This increases a generation force per unit current flowing through the coil magnet 210B, thus enabling to increase the efficiency of the actuator 236.

In the present embodiment, the position sensor 240 is a reflected-light detection type fiber sensor replacing the eddy-current type displacement sensor. As shown in FIG. 19, the position sensor 240 is constituted by an optical fiber input head 241 and an optical fiber detection head 242. Each of the four position sensors 240 extends above the beams from the respective side walls. The light emitted from the optical fiber input head 241 is reflected by the rear surface of the mirror holder 233 and at least a part of the reflected light is introduced into the optical fiber detection head 242. According to this incident light amount, a displacement of the mirror holder is measured.

This on-fulcrum movement drive apparatus 231 having the aforementioned configuration according to the embodiment B2 also has a control block (not depicted) of the same type as the control block 220 of the on-fulcrum movement drive apparatus 201. The actuators 236 are driven according to a detection result from the position to control the angle of the mirror holder 233, i.e., the angle o the mirror 232.

In this on-fulcrum movement drive apparatus 231 also, the mirror 232 to be driven is fixed to the elastic support mechanism 234. Accordingly, there will be generated no fluctuation or friction like in the case of a spherical bearing. During drive, no eternal non-linear component is involved in the control system. Consequently, it is possible to control the angle of the mirror 232 with a high accuracy.

Moreover, there is no need of holding a lubricant like in the spherical bearing. Accordingly, the on-fulcrum movement drive apparatus according to the present embodiment has no problem of lubricant evaporation and can be used in a vacuum such as in an outer space.

Furthermore, in the on-fulcrum movement drive apparatus 231, a wide open space is available behind at the back of the mirror 232 and the mirror holder 233 as an object to be driven. This facilitates inspection and repair of the object to be driven. When the object to be driven is an antenna or the like, wiring to the object to be driven can also be performed easily.

While the aforementioned embodiments B1 and B2 have been described as an example for driving an antenna and mirror, it is also possible to drive a positioning table by using the on-fulcrum movement drive apparatus according to the present embodiments.

Moreover, in the aforementioned embodiments B1 and B2, the elastic support mechanism 205 is constituted by the four plate springs 207 and the elastic support mechanism 234 is constituted by the four coil springs 235. However, the elastic support mechanisms 205, 234 may also be constituted by any number of plate springs and coil springs equal to or above two.

Furthermore, the number of the position sensors 211, 240 is not to be limited to four as in the aforementioned embodiments but can be any number equal to or above two. When using two position sensors, for example, they can be arranged on the X and Y axes so as to detect angle displacement around the X and Y axes, respectively.

Moreover, the number of the actuators 208, 236 is not to be limited to four but can be any number equal to or above two. When using two actuators, for example, they can be arranged on the X and Y axes so as to move the object to be driven around the X and Y axes, respectively.

[A] The laser pointing apparatus according to the embodiments A1, A2, A3 of the present invention includes: at least three arms extending from the peripheral end of the mirror holder to support the mirror holder; coil type electromagnets attached to the arms; and permanent magnets arranged to oppose the respective coil magnets. This configuration brings about the following effects.

The first effect is that it is possible to reduce the size of the laser pointing apparatus because the drive source is a combination of small-volume coil magnets and permanent magnets.

The second effect is that it is possible to reduce the weight of the laser pointing apparatus because a movable block constituted by a mirror, mirror holder, arms, and coil magnets are all small in weight, which enables to reduce the weight of the permanent magnets and elastic support mechanism for driving the movable block.

The third effect is that it is possible to reduce the power consumption. This is because the movable block including the mirror, mirror holder, arms, and coil magnets is not heat as a whole, and there is not need of driving a large-mass objects such as the permanent magnets and the elastic support mechanism.

The fourth effect is that it is possible to control the position of a reflected laser beam with a high accuracy. This is because movement is driven by a linear and non-contact drive source such as coil magnets and permanent magnets and the elastic support mechanism is constituted by a linear spring element alone. This eliminates involvement of a non-linear element in the control system.

Moreover, according to the third embodiment (A3), the positions of the coil magnets and the permanent magnets are interchanged. This enables to reduce the affect of heat generated by the coil magnets, upon the mirror via the mirror holder.

[B] The on-fulcrum movement drive apparatus according to the fourth and fifth embodiments of the present invention includes: a frame for supporting an object to be driven; an elastic support mechanism made from an elastic material and provided between the object to be driven and the frame so as to support the object to be driven at one point on the rear side of the object in such a manner that the object can be moved around tow vertically intersecting axes; and actuators mounted on the frame for moving the object by applying a force to a position apart from the supporting point.

Because the object to be driven is supported at one point on its rear side by the elastic support mechanism made from an elastic material, it is possible to move the object around two vertically intersecting axes by applying a force to the object from the actuators.

Moreover, the object to be driven is fixed to the elastic support mechanism. Accordingly, no fluctuation or friction will be generated as when a spherical bearing is used. During a drive period, non non-linear external component is involved in the control system. Consequently, it is possible to control the angle of the object to be driven with a high accuracy.

Furthermore, there is no need of maintaining a lubricant as in a spherical bearing, i.e., there is no problem of lubricant evaporation. Accordingly, the on-fulcrum movement drive apparatus according to the present invention can be used in a vacuum such as in an outer space.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-079855 (Filed on Mar. 26, 1998) and Japanese Patent Application No. 10-321868 (Filed on Nov. 12, 1998) including specification, claims, drawings and summary are incorporated herein by reference in its entirety.

What is claimed is:

1. An on-fulcrum movement drive apparatus for moving an object to be driven around two imaginary axes vertically intersecting each other, said apparatus comprising:
   a frame for supporting the object to be driven;
   an elastic support mechanism provided between the frame and the object to be driven, for supporting the object to be driven at one point on the rear surface of the object, so that the object is movably mounted on the frame; and
   an actuator provided on the frame for moving the object to be driven, by applying a force to a position on the object which is apart from the support position supported by said elastic support mechanism, wherein said drive apparatus does not include a rigid spherical bearing provided between the frame and the object to be driven, for supporting the object to be driven at one point at a center of the rear surface of the object, so that the object is movably mounted on the frame.

2. An on-fulcrum movement drive apparatus as claimed in claim 1, said actuator applies a force to the object to be driven, from the rear side of the object.

3. The on-fulcrum movement drive apparatus as claimed in claim 1, said apparatus further comprising:

a position sensor for detecting positions of at least two points on the object to be driven, with respect to the position of the frame; and a control block for receiving an output signal from the position sensor so as to calculate an angle of the object to be driven, and driving the actuator according to the calculated angle and the specified angle, thus controlling the angle of the object to be driven, wherein said position sensor is selected from a group consisting of an eddy-current displacement sensor, a laser interferometry sensor, and a reflected light amount detection type optical fiber sensor.

4. An on-fulcrum movement drive apparatus as claimed in claim 1, wherein said object to be driven is selected from a group consisting of an antenna, a mirror, and an on-fulcrum movement seat.

5. An on-fulcrum movement drive apparatus as claimed in claim 1, wherein said apparatus is mounted on a space object together with said object to be driven.

6. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame; and an actuator provided on the frame for moving the object to be driven, by applying a force to a position on the object which is apart from the support position supported by said elastic support mechanism, wherein said support position of the object to be driven is approximately at the center of the rear surface of the object to be driven.

7. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame; and an actuator provided on the frame for moving the object to be driven, by applying a force to a position on the object which is apart from the support position supported by said elastic support mechanism, wherein said elastic support mechanism includes:

an elastic shaft made from a non-expandable elastic member extending backward of the object to be driven and having one end fixed to the rear surface of the object to be driven and the other end fixed to the frame; and at least three springs, each having one end fixed to the object to be driven where the elastic shaft's end is fixed and the other end fixed to the frame at different positions so that the springs are spread toward the frame.

8. An on-fulcrum movement drive apparatus as claimed in claim 7, said apparatus has four of said springs are arranged approximately at 90 degrees to adjacent springs.

9. An on-fulcrum movement drive apparatus as claimed in claim 7, wherein said springs are plate springs.

10. An on-fulcrum movement drive apparatus as claimed in claim 7, wherein said springs are coil springs.

11. An on-fulcrum movement drive apparatus as claimed in claim 7, wherein the frame includes a base opposing to the rear surface of the object to be driven, and the lower ends of the elastic shaft and the springs are fixed to the base.

12. An on-fulcrum movement drive apparatus as claimed in claim 11, wherein the actuator is fixed to the base.

13. An on-fulcrum movement drive apparatus as claimed in claim 11, wherein the frame includes:

walls arranged at the back of the object to be driven so as to surround the object; and a beam bridging the walls, wherein the elastic shaft has a lower end fixed to the beam and the springs have their lower ends fixed to the walls.

14. An on-fulcrum movement drive apparatus as claimed in claim 13, wherein the actuators are attached to the walls.

15. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame; and an actuator provided on the frame for moving the object to be driven, by applying a force to a position on the object which is apart from the support position supported by said elastic support mechanism, wherein said actuator applies a force to at least two positions on the object to be driven.

16. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame; and an actuator provided on the frame for moving the object to be driven, by applying a force to a position on the object which is apart from the support position supported by said elastic support mechanism, wherein said actuator applies a force to four positions on the object to be driven.

17. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame; and an actuator provided on the frame for moving the object to be driven, by applying a force to a position on the object which is apart from the support position supported by said elastic support mechanism, wherein said actuator is realized as four actuators arranged approximately at an identical interval on an imaginary circle surrounding the center of the rear surface of the object to be driven, so that each of the actuators applies from their respective positions a force to the object to be driven.

18. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame; and an actuator provided on the frame for moving the object to be driven, by applying a force to a position on the object which is apart from the support position supported by said elastic support mechanism, wherein said actuator includes a coil magnet and a permanent magnet, one of which is fixed to the object to be drive and the other is fixed to the frame in such a manner that the coil magnet and the permanent magnet are arranged at a distance to oppose to each other.

19. An on-fulcrum movement drive apparatus as claimed in claim 18, wherein the permanent magnet is fixed to the object to be driven and the coil magnet is fixed to the frame.

20. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame;

an actuator provided on the frame for moving the object to be driven, by applying a force to a position on the object which is apart from the support position supported by said elastic support mechanism;

a position sensor for detecting positions of at least three points on the object to be driven, with respect to the position of the frame; and a control block for receiving an output signal from the position sensor so as to calculate an angle of the object to be driven, and driving the actuator according to the calculated angle and the specified angle, thus controlling the angle of the object to be driven.

21. An on-fulcrum movement drive apparatus as claimed in claim 20, wherein said position sensor is a non-contact type sensor for detecting the position in a non-contact state.

22. An on-fulcrum movement drive apparatus as claimed in claim 21, wherein said position sensor is provided at the back of the object to be driven at a distance from the object for detecting a distance up to the rear surface of the object.

23. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame;

an actuator provided on the frame for moving the object to be driven, by applying a force to a position on the object which is apart from the support position supported by said elastic support mechanism;

a position sensor for detecting positions of at least two points on the object to be driven, with respect to the position of the frame; and a control block for receiving an output signal from the position sensor so as to calculate an angle of the object to be driven, and driving the actuator according to the calculated angle and the specified angle, thus controlling the angle of the object to be driven, wherein said position sensor is a non-contact type sensor for detecting the position in a non-contact state, and said position sensor is realized four position sensors arranged at the back of the object to be driven, approximately at an identical interval from one another on an imaginary circle surrounding the center of the rear surface of the object, each for detecting a distance up to the rear surface of the object to be driven.

24. An on-fulcrum movement drive apparatus as claimed in claim 23, wherein each of said position sensor is located approximately at an identical distance from the rear surface of the object to be driven at its stationary position before movement.

25. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame;

an actuator provided on the frame for moving the object to be driven, by applying a force to a position on the object which is apart from the support position supported by said elastic support mechanism;

a position sensor for detecting positions of at least two points on the object to be driven, with respect to the position of the frame; and a control block for receiving an output signal from the position sensor so as to calculate an angle of the object to be driven, and driving the actuator according to the calculated angle and the specified angle, thus controlling the angle of the object to be driven, wherein the actuator is realized by four actuators arranged at the back of the object to be driven and approximately at an identical interval from one another on an imaginary circle surrounding the center of the rear surface of the object to be driven; and the position sensor is realized by four position sensors located between the center of the rear surface of the object and the respective actuators.

26. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame;

an actuator provided on the frame for moving the object to be driven, by applying a force to a position on the object which is apart from the support position supported by said elastic support mechanism;

a position sensor for detecting positions of at least two points on the object to be driven, with respect to the position of the frame; and a control block for receiving an output signal from the position sensor so as to calculate an angle of the object to be driven, and driving the actuator according to the calculated angle and the specified angle, thus controlling the angle of the object to be driven, wherein the actuator is realized by four actuators arranged at the back of the object to be driven and approximately at an identical interval from one another on an imaginary circle surrounding the center of the rear surface of the object to be driven; and the position sensor is realized by four position sensors, each located between two adjacent actuators.

27. An on-fulcrum movement drive apparatus for moving an object to be driven around two imaginary axes vertically intersecting each other, said apparatus comprising:

a frame for supporting the object to be driven;

an elastic support mechanism provided between the frame and the object to be driven, for supporting the object to be driven at one point on the rear surface of the object, so that the object is movably mounted on the frame;

an actuator provided on the frame for moving the object to be driven, by applying a force to a position on the object which is apart from the support position supported by said elastic support mechanism;

a position sensor for detecting positions of at least two points on the object to be driven, with respect to the position of the frame; and a control block for receiving an output signal from the position sensor so as to calculate an angle of the object to be driven, and driving the actuator according to the calculated angle and the specified angle, thus controlling the angle of the object to be driven, wherein the actuator is realized by four actuators arranged at the back of the object to be driven and approximately at an identical interval from one another on an imaginary circle surrounding the center of the rear surface of the object to be driven; and the position sensor is realized by four position sensors, each located at such a position that a corresponding actuator is sandwiched by the position sensor and the center of the rear surface of the object to be driven.

* * * * *